(12) United States Patent
Ellis

(10) Patent No.: US 8,934,660 B2
(45) Date of Patent: Jan. 13, 2015

(54) TWO DIMENSIONAL INFORMATION SYMBOL

(75) Inventor: Paul Joseph Ellis, Gladesville (AU)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 13/282,268

(22) Filed: Oct. 26, 2011

(65) Prior Publication Data

US 2012/0106780 A1 May 3, 2012

(30) Foreign Application Priority Data

Oct. 29, 2010 (AU) ................................ 2010238503

(51) Int. Cl.
*G06K 9/00* (2006.01)
*H04N 1/32* (2006.01)
*G06T 1/00* (2006.01)

(52) U.S. Cl.
CPC .......... *H04N 1/32219* (2013.01); *G06T 1/0021* (2013.01); *H04N 1/3216* (2013.01); *H04N 1/32251* (2013.01); *H04N 1/32309* (2013.01); *H04N 1/3232* (2013.01)
USPC ........................................................ 382/100

(58) Field of Classification Search
None
See application file for complete search history.

(56) References Cited

U.S. PATENT DOCUMENTS

| | | | | |
|---|---|---|---|---|
| 6,069,886 A | * | 5/2000 | Ayerst et al. | 370/336 |
| 6,145,081 A | * | 11/2000 | Winograd et al. | 726/33 |
| 6,548,768 B1 | | 4/2003 | Pettersson et al. | |
| 7,158,653 B2 | * | 1/2007 | Fletcher et al. | 382/100 |
| 7,545,938 B2 | * | 6/2009 | Nomizu et al. | 380/220 |
| 7,806,315 B2 | * | 10/2010 | Matsumura | 235/375 |
| 8,538,066 B2 | * | 9/2013 | Petrovic et al. | 382/100 |
| 2003/0123660 A1 | * | 7/2003 | Fletcher et al. | 380/205 |
| 2005/0025338 A1 | * | 2/2005 | Zhao et al. | 382/100 |
| 2005/0053239 A1 | * | 3/2005 | Nomizu et al. | 380/220 |
| 2006/0075241 A1 | | 4/2006 | DeGuillaume et al. | |
| 2008/0297853 A1 | * | 12/2008 | Yang et al. | 358/3.28 |
| 2010/0142756 A1 | * | 6/2010 | Fields et al. | 382/100 |
| 2011/0096955 A1 | * | 4/2011 | Voloshynovskiy et al. | 382/103 |

FOREIGN PATENT DOCUMENTS

| | | |
|---|---|---|
| AU | 2005209709 A | 3/2007 |
| WO | 2008/107001 A1 | 9/2008 |
| WO | 2009/101491 A2 | 8/2009 |

* cited by examiner

*Primary Examiner* — Nancy Bitar
(74) *Attorney, Agent, or Firm* — Canon USA Inc. IP Division

(57) ABSTRACT

Disclosed is a method (500) of encoding a message (501) into a target area of an original image by determining a set of data items into which the message can be partitioned, partitioning the message into the data items, encoding (580) a first mark into the target area at a location determined by applying (550) a hash function (505) to a first data item, and encoding (580) a second mark into the target area at a location dependent upon (a) a hash value determined by applying (550) the hash function (505) to the first data item and a second data item, (b) the location of the encoded first mark, and (c) a predetermined constraint (504), wherein the first and second marks form at least part of a pattern of marks in the target area of the encoded image, the pattern having a visual characteristic defined by the predetermined constraint.

11 Claims, 31 Drawing Sheets

TWO DIMENSIONAL INFORMATION SYMBOL

CROSS-REFERENCE TO RELATED APPLICATIONS

This application claims the benefit under 35 U.S.C. §119 of the filing date of Australian Patent Application No. 2010238503, filed Oct. 29, 2010, hereby incorporated by reference in its entirety as if fully set forth herein.

FIELD OF THE INVENTION

The current invention relates to computer-readable marks in images and on printed pages and, in particular, to computer-readable marks with a high data density and with low visibility to the human eye.

DESCRIPTION OF THE RELATED ART

In many situations it is desirable to embed digital information into a printed or digital original image with as little disturbance as possible to the appearance of the original image, to form an encoded image into which the digital information has been incorporated.

One technique used to identify unauthorized copies of digital multimedia data is to embed a pattern or patterns into the original image, such that the embedded pattern is not visible to the unaided eye of an observer in the encoded image. Such a pattern is usually called a watermark. Ownership of a copied image may be established by detecting the presence of the watermark embedded in the encoded image.

Systems are known for embedding a pattern or patterns into an original image. Several watermarking schemes have been developed to imperceptibly embed information in an original image so that the embedded information may later be retrieved from the encoded image. This embedded information is commonly used to check the provenance (i.e., the place of origin or history) of the encoded image, record information about the original image in a manner that is not directly visible, or even store information totally unrelated to the original image.

Such information will typically remain with the encoded image even if the header and other metadata contained in the encoded image file are removed. The information may be usefully employed to define the address or location of original metadata related to that original image. The metadata may contain owner identification, camera settings, geographical location, details of the subjects in the original image, or any number of other pieces of information. The image metadata of which the embedded information provides the address or location may be stored on the same device as the encoded image, or on a local or remote server connected by a network.

The information stored in a watermark of an encoded image may also be used to trace the source of illegal copies. In this case, the owner can embed different information in copies of the encoded image supplied to different customers. By comparing the information extracted from illegal copies to that added to the copies of the encoded image supplied to customers, the customers who have broken their license agreement by supplying the data to third parties may be identified.

Another use of such information stored in a watermark of an encoded image is for copy protection purposes. In this case, the watermark can include copy- and playback-prohibition information. A watermark detector in the recording or playback device may use the prohibition information to prevent copying or playback of such an encoded image.

Yet another reason for using a watermark to store information in an encoded image is simply to hide that information. As watermarks in encoded images are typically imperceptible to the human eye, the presence of such information will generally be unnoticed by an observer.

A difficulty arises with respect to embedding watermarking patterns in such a way that they are (a) imperceptible to observers of the encoded image; (b) are robust to image degradation; and also (c) carry sufficient information to be useful in their intended application.

Other computer-readable marks with higher visibility than watermarks are also commonplace, particularly on printed pages, with many varieties such as the common bar code in extremely widespread use.

Although the common barcode is ubiquitous, an increasing number of alternative computer-readable marks are reaching the marketplace. Many of these new varieties of mark provide much greater data carrying capacity than the common barcode, enabling a wider range of applications than is possible with the limiting 30 to 60 bits of data that can be stored in a common barcode. Other varieties of mark improve on the common barcode by exhibiting reduced visibility, which has the advantage that a larger portion of the page is left free to contain human-readable content. An additional advantage of low visibility marks is that information can be hidden in a page, enabling applications such as steganography.

As wider use is made of computer-readable marks, and new applications for computer-readable marks are found, there is an increasing need for marks that provide a high data content without consuming large areas of the page. It is also desirable that marks be robust to the types of rough treatment that printed pages commonly receive, such as folding, wrinkling, staining and tearing.

While marks with high data density are available, and other marks with low visibility are available, there remains a need for marks that simultaneously provide high data density, low visibility and high robustness.

SUMMARY OF THE INVENTION

It is an object of the present invention to substantially overcome, or at least ameliorate, one or more disadvantages of existing arrangements.

Disclosed are arrangements, referred to as Crystallographic Bar Code (CBC) arrangements, which seek to address the above problems by encoding a message into an original image using a suitable pseudorandom process, preferably a "blue noise" process, subject to a defined constraint, preferably an exclusion radius in the described arrangements.

A new variety of computer readable symbol that can be embedded into digital images or printed onto pages in order to embed information (also referred to as "data" or a "message") into an original image is thus disclosed. This symbol is denoted a Crystallographic Bar Code. As will be described in relation to FIG. 2, the Crystallographic Bar Code (also referred to as a CBC or a CBC symbol or merely as a symbol in this description) can, in one CBC arrangement, be formed by a number of "marks" such as 201 in FIG. 2. The phrase "pattern of marks" is also used interchangeably with the term CBC unless otherwise indicated.

According to one aspect of the present invention there is provided a method of encoding a message into a target area of an original image to form an encoded image, the method including the steps of determining a set of data items into which the message can be partitioned; partitioning the message into the data items; encoding a first mark into the target area at a location determined by applying a hash function to a first data item; and encoding a second mark into the target area at a location dependent upon (a) a hash value determined by applying the hash function to the first data item and a second data item, (b) the location of the encoded first mark, and (c) a predetermined constraint; wherein the first and second marks form at least part of a pattern of marks in the target area of the encoded image, the pattern having a visual characteristic defined by the predetermined constraint.

According to another aspect of the present invention, there is provided a method of decoding a pattern of marks satisfying a predetermined constraint in an encoded image, to reconstruct a recovered message, the method including the steps of (a) determining a set of data items into which candidate messages can be partitioned; (b) determining a set of candidate messages; (c) selecting a current candidate message from the determined set of candidate messages; (d) applying the encoding method to the current candidate message to generate a current pattern of marks; (e) if the current pattern of marks does not permit addition of a further mark without violating the predetermined constraint, then the current candidate message is one of the recovered message and a null set; (f) if the current pattern of marks does permit addition of a further mark without violating the predetermined constraint, then the method comprises the further steps of: (fa) creating a set of new candidate messages by appending each possible data item from the step (a) to the current candidate message; (fb) adding the new set of candidate messages to the set determined in the step (b); and (fc) repeating the steps (c) to (f).

According to another aspect of the present invention, there is provided an apparatus for implementing any one of the aforementioned methods.

According to another aspect of the present invention there is provided a computer program product including a computer readable medium having recorded thereon a computer program for implementing any one of the methods described above.

Other aspects of the invention are also disclosed.

BRIEF DESCRIPTION OF THE DRAWINGS

At least one embodiment of the present invention will now be described with reference to the drawings, in which.

DETAILED DESCRIPTION

Figure 1A:
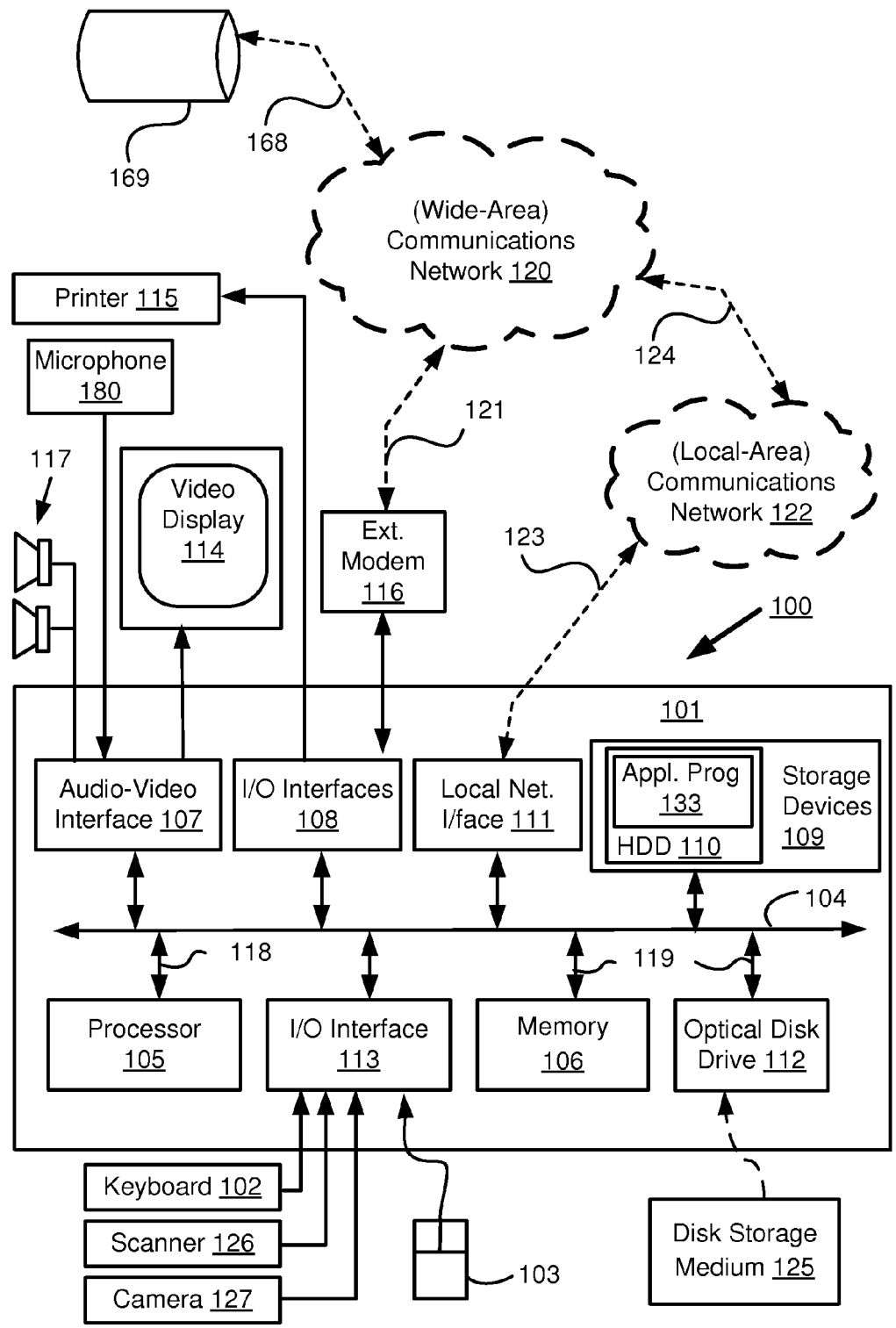
FIGS. 1A and 1B collectively form a schematic block diagram of a general purpose computer system upon which CBC arrangements described can be practiced.

It is to be noted that the discussions contained in the "Background" section and the section above relating to prior art arrangements relate to discussions of devices which may form public knowledge through their use. Such discussions should not be interpreted as a representation by the present inventor(s) or the patent applicant that such documents or devices in any way form part of the common general knowledge in the art.

Methods, apparatuses, systems, and computer program products for embedding, printing and reading a CBC are disclosed hereinafter. In the following description, numerous specific details, including a particular type of printer (i.e.: a laser printer or an inkjet printer), a particular type of scanner (i.e.: a flatbed scanner), and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

Processing Environment

Figure 1B:
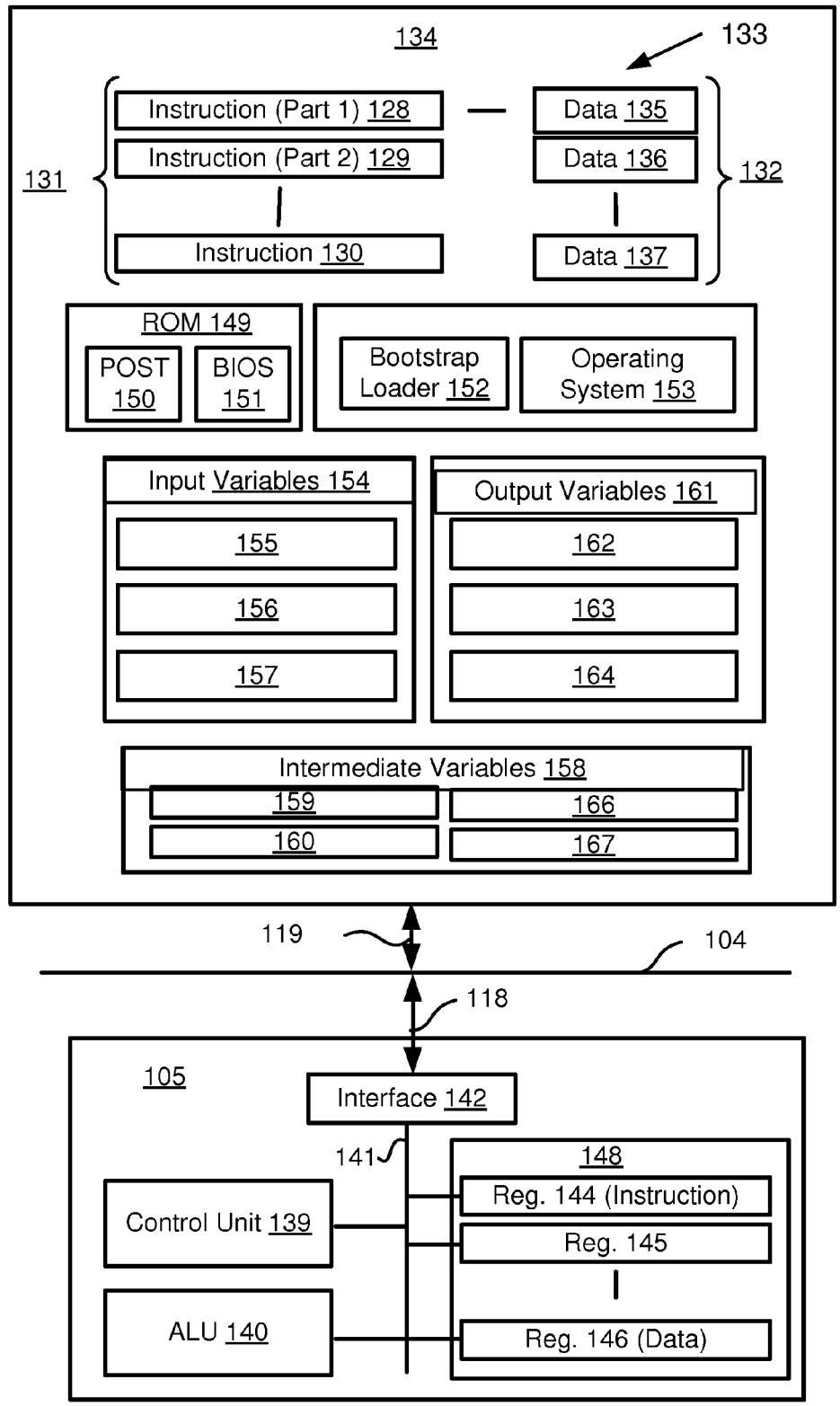

FIGS. 1A and 1B depict a general-purpose computer system 100, upon which the various CBC arrangements described can be practised.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a server 169 over a communications network 120 via connections 121 and 168. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111. The networks 120 and 122 may connect to sources, e.g., the server 169, to be stored in a CBC or of image data. Image data may also be sourced from the scanner 126. The scanner 126 may be a flatbed scanner for scanning documents, a fingerprint scanner, an eye scanner for biometric scanning or another device for capturing digital images.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstation™, Apple Mac™ or a like computer systems.

The CBC methods may be implemented using the computer system 100 wherein the processes of FIGS. 5, 7, 11, 16, and 24, to be described, may be implemented as one or more software application programs 133 executable within the computer system 100. In particular, the steps of the method of creating and/or reading a CBC are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the CBC methods and a second part and the corresponding code modules manage a user interface between the first part and the user.

The CBC software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for image processing, particularly for creating and/or reading a CBC.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for creating and/or reading a CBC.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the storage devices 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfill various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed CBC arrangements use input variables (the term "variables" may also include data) 154, which are stored in the memory 134 in corresponding memory locations 155, 156 and 157. Examples of input variables include original image data or information to be embedded.

The CBC arrangements produce output variables (the term "variables" may also include data) 161, which are stored in the memory 134 in corresponding memory locations 162, 163 and 164. Examples of output variables include encoded image data or recovered information previously embedded.

Intermediate variables (the term "variables" may also include data) 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129 or 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 5, 7, 11, 16, and 24, is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The CBC methods may alternatively be implemented in dedicated hardware such as one or more gate arrays and/or integrated circuits performing the CBC functions or sub functions. Such dedicated hardware may also include graphic processors, digital signal processors, or one or more microprocessors and associated memories. If gate arrays are used, the process flow charts in FIGS. 5, 7, 11, 16, and 24 may be converted to Hardware Description Language (HDL) form. This HDL description may be converted to a device level netlist which is used by a Place and Route tool to produce a file which is downloaded to the gate array to program it with the design specified in the HDL description.

Basic Structure

Figure 2:
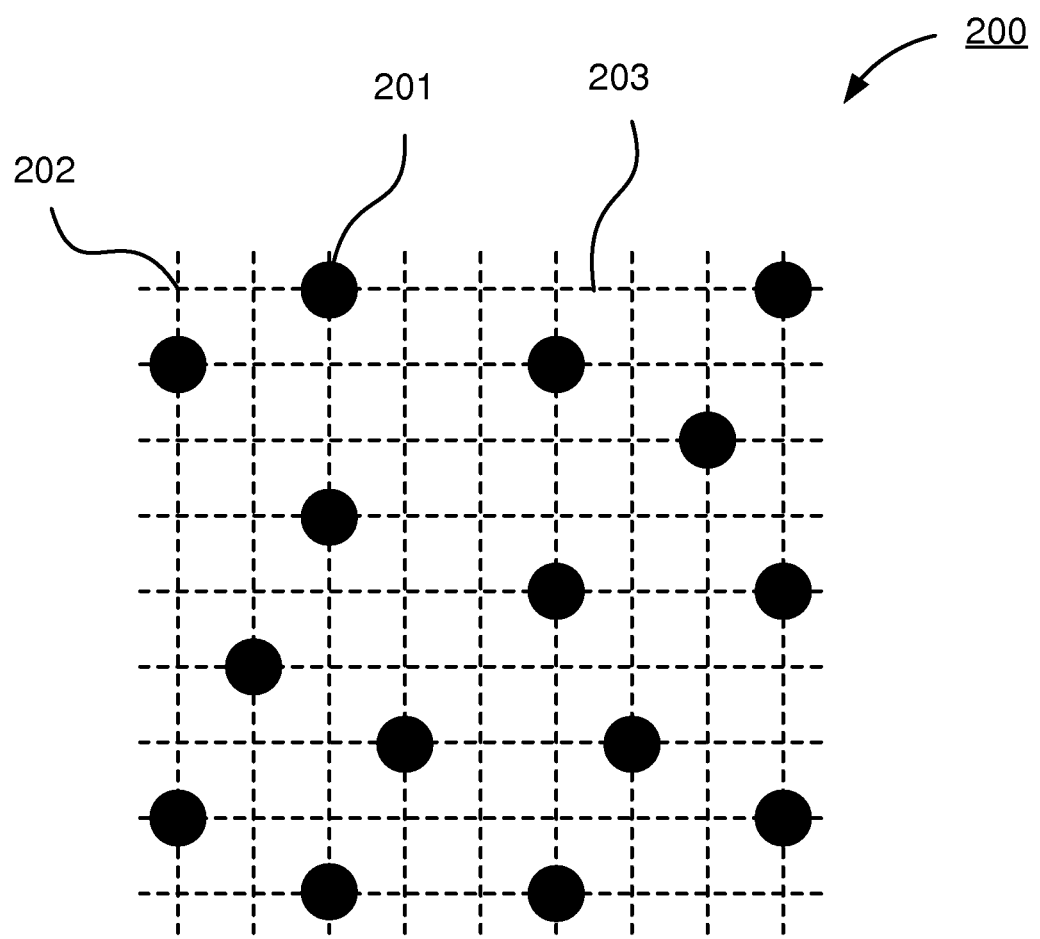
FIG. 2 shows an enlarged view of a basic CBC (i.e., a simple CBC used for illustrative purposes)

FIG. 2 shows an enlarged view of a basic CBC 200. The CBC 200 is formed by a number of marks such as 201. In the example shown in FIG. 2, each mark 201 is a dot lying at an intersection point (e.g., 202) of a grid of lines (e.g., 203).

In general it is not necessary for the CBC arrangements that marks be constrained to lie on a grid. Rather, the CBC arrangements simply require that a set of locations at which marks may be placed is defined. For the purposes of the following discussion, the set of such locations will be denoted the possible locations $(x, y)_n$.

In the example of FIG. 2, only the marks such as 201 form the CBC 200. The grid is illustrated purely for explanation of the location of the marks 201 and may be considered "virtual" as a consequence.

Grid-Based Layout Scheme

As the simple grid-based layout exemplified by the CBC 200 is used in preferred CBC arrangements described below, this scheme will now be described in more detail with reference to FIG. 3.

Figure 3:
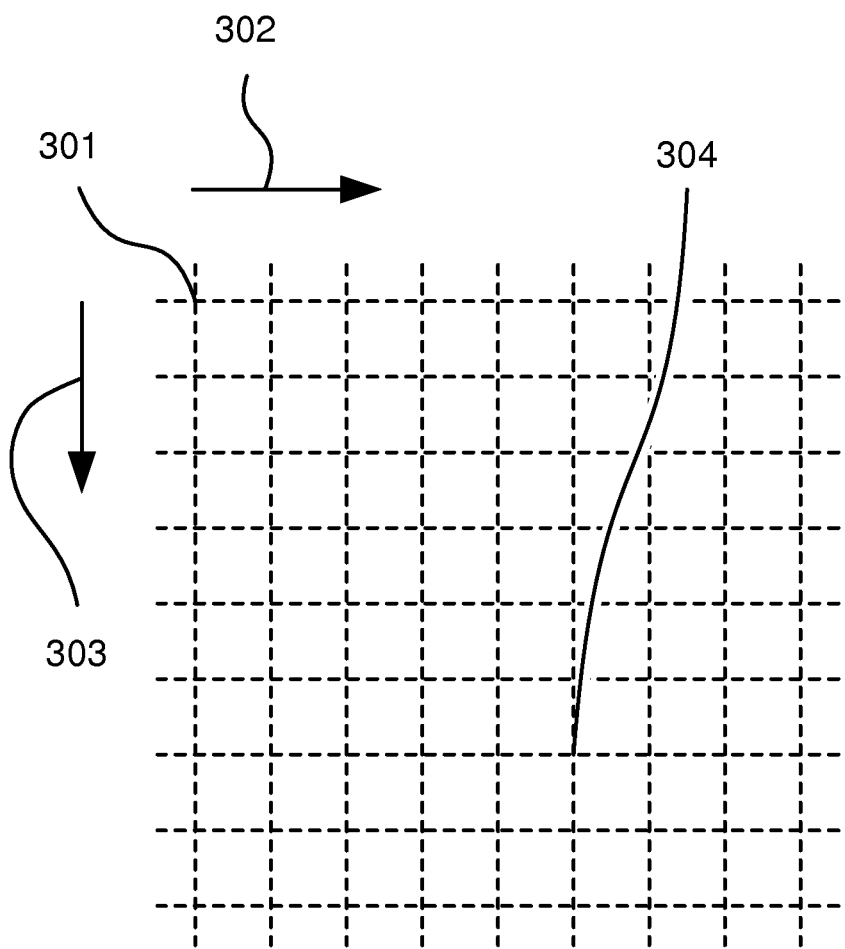
FIG. 3 shows an empty grid into which a pattern of marks making up a CBC may be placed.

FIG. 3 illustrates a set of possible locations $(x, y)_n$ arranged in an N×N grid. Each such location may be identified by an integer pair (i, j), with i, j∈ 0, ..., N-1. Grid position (0, 0) (location 301) is the upper left corner grid position; the i coordinate increases from left to right in the direction 302; the j coordinate increases from top to bottom in a direction 303. Thus a location 304, for example, may be labelled grid position (5, 6).

More specifically, consider an example in which marks are to be placed within an image 500 pixels in width and 500 pixels in height on a regular 41×41 grid. The grid axes are aligned with the image axes, and have a total width and total height of 200 pixels each so that the spacing between grid points in the directions of the axes is 5 pixels. Finally, the grid is centred near the centre of the image at image coordinate (250, 250). In this example, the corner grid positions (0, 0), (0, 40), (40, 0) and (40, 40) would thus correspond with image coordinates (150, 150), (150, 350), (350, 150) and (350, 350), respectively.

Blue Noise Pattern

Returning to FIG. 2, it is apparent that marks are not located at all possible locations, but are distributed sparsely over the area of the grid.

In the preferred CBC arrangement, the marks are arranged to form a "Poisson disk" or "blue noise" pattern.

Such distributions are used in computer graphics and are advantageous in both of the CBC arrangements described below. In the "watermarking" CBC arrangement it is desirable that the "basis function" marks not be placed too close to each other, thereby ensuring that the marks are more distinguishable from each other. In the preferred CBC arrangement where marks are compact "dots", blue noise patterns are considered to have the desirable property of relatively low visibility for a given dot density.

Figure 4:
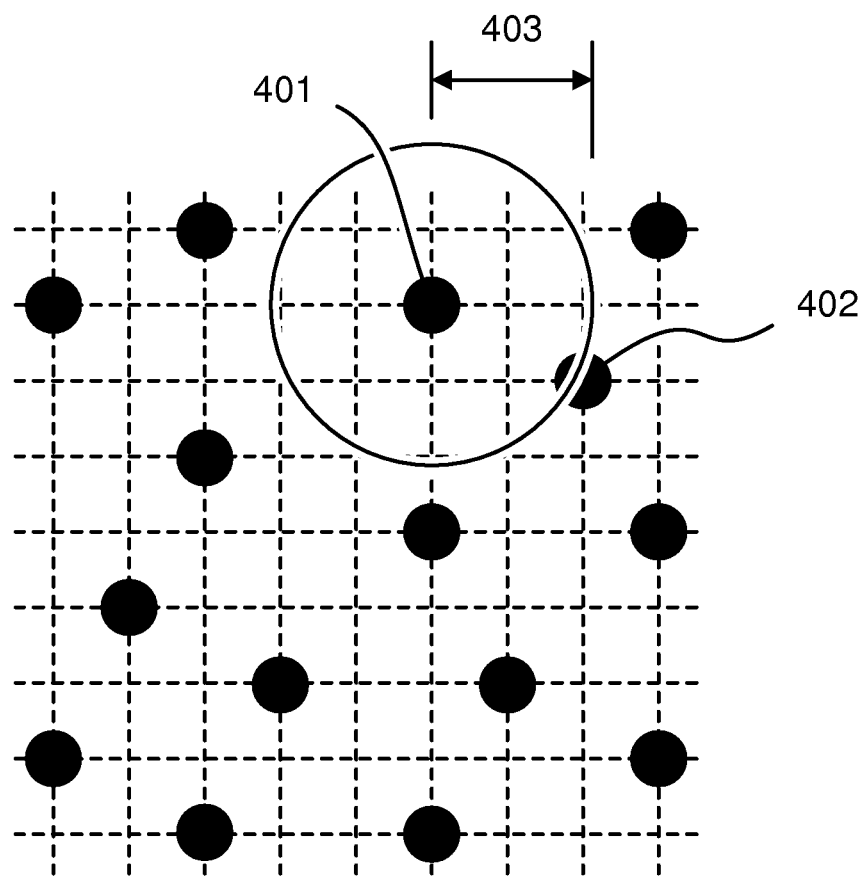
FIG. 4 shows a basic CBC with an associated exclusion radius (described in relation to FIG. 4) illustrated for one mark.

As illustrated in FIG. 4, the important characteristics of a blue noise pattern are that:

1. the centres of no two marks (e.g., 401 and 402) lie closer than a specified minimum allowed distance 403 from each other (this relates to what is referred to as the "density" of the marks); and 2. all possible grid locations $(x, y)_n$ lie closer than the distance 403 from the centre of at least one mark in the pattern (this relates to the extent to which the marks "fill" the grid).

The minimum allowed distance between two marks in a blue noise pattern will be referred to as an "exclusion radius", $r_e$.

It is not necessary for the CBC arrangements that marks be constrained according to the blue noise conditions specified above. Rather, the CBC arrangements simply require that there be some constraint on the subset of possible locations $(x, y)_n$ at which marks may be placed. In fact in general, the CBC arrangements may be implemented using a suitable pseudorandom process subject to a defined spatial constraint on the possible locations $(x, y)_n$ at which marks may be placed.

For the purposes of the following description, for a set of marks M, the constraint will henceforth be denoted C(M), where the constraint is "satisfied" when C(M) is true and "violated" when C(M) is false.

In the preferred CBC arrangement, where the marks are constrained by the blue noise conditions, the constraint may be expressed according to Formula (1) as follows:

$$C(M) = |a-b| \leq r_e \forall a, b \in M \quad (1)$$

where:

|a−b| denotes the Euclidean distance between the centres of mark a and mark b; and $\forall$ a, b∈M denotes "for all combinations of mark a and mark b in M".

A set M of marks satisfying the constraint C(M), and to which no mark may be added at any possible location $(x, y)_n$ without violating the constraint (i.e., the set M of marks in question does not permit addition of a mark without violating the constraint) will be referred to as a "maximal" set of marks. Conversely, where a valid mark may be added without violating the constraint, the set M is "not maximal". Formula (2) expresses this relationship more concisely as follows:

$$M \text{ is maximal} \Leftrightarrow \nexists (x,y)_n : C(M \cup (x,y)_n) \quad (2)$$

where:

$\nexists$ denotes non-existence; and

M∪(x, y)$_n$ denotes the set M with the point $(x, y)_n$ added.

Finally, as it is understood that a set of marks will form a pattern, for the purposes of the following description the terms "set of marks", "pattern of marks" and "pattern" may be used interchangeably.

Encoding Data

In a practical CBC data encoding implementation, given a set of possible locations $(x, y)_n$ there will typically be many maximal sets of marks M satisfying a constraint C(M). Consequently, different messages may be encoded by associating each different message with a different set of marks (and thus distinct patterns).

A first object of the preferred CBC arrangement is to create a CBC by generating a pattern of marks encoding a specified message.

A method 500 of encoding data (also referred to as a "message" or "message data") into a pattern of marks will now be described with reference to the schematic flow diagram FIG. 5. A general description of the method is provided first, after which a specific example is described.

In general, the message can be regarded as being made up of a sequence of "data items". In one example, if the message is represented as a string of characters, then the string can be partitioned (or otherwise decomposed or transformed) into smaller strings, each referred to as a data item. These data items can be concatenated, or appended to each other, to form either extending data item sequences of increasing size (e.g., see a step 540 in FIG. 5), or candidate messages (e.g., see a step 1150 in FIG. 11).

In one preferred CBC arrangement, the message is a string of binary numbers, and each data item is a binary number. However, other types of data items, such as decimal numbers or alphanumeric characters, may be used provided that an appropriate "hashing" function, described below with respect to step 550, is available.

Figure 5:
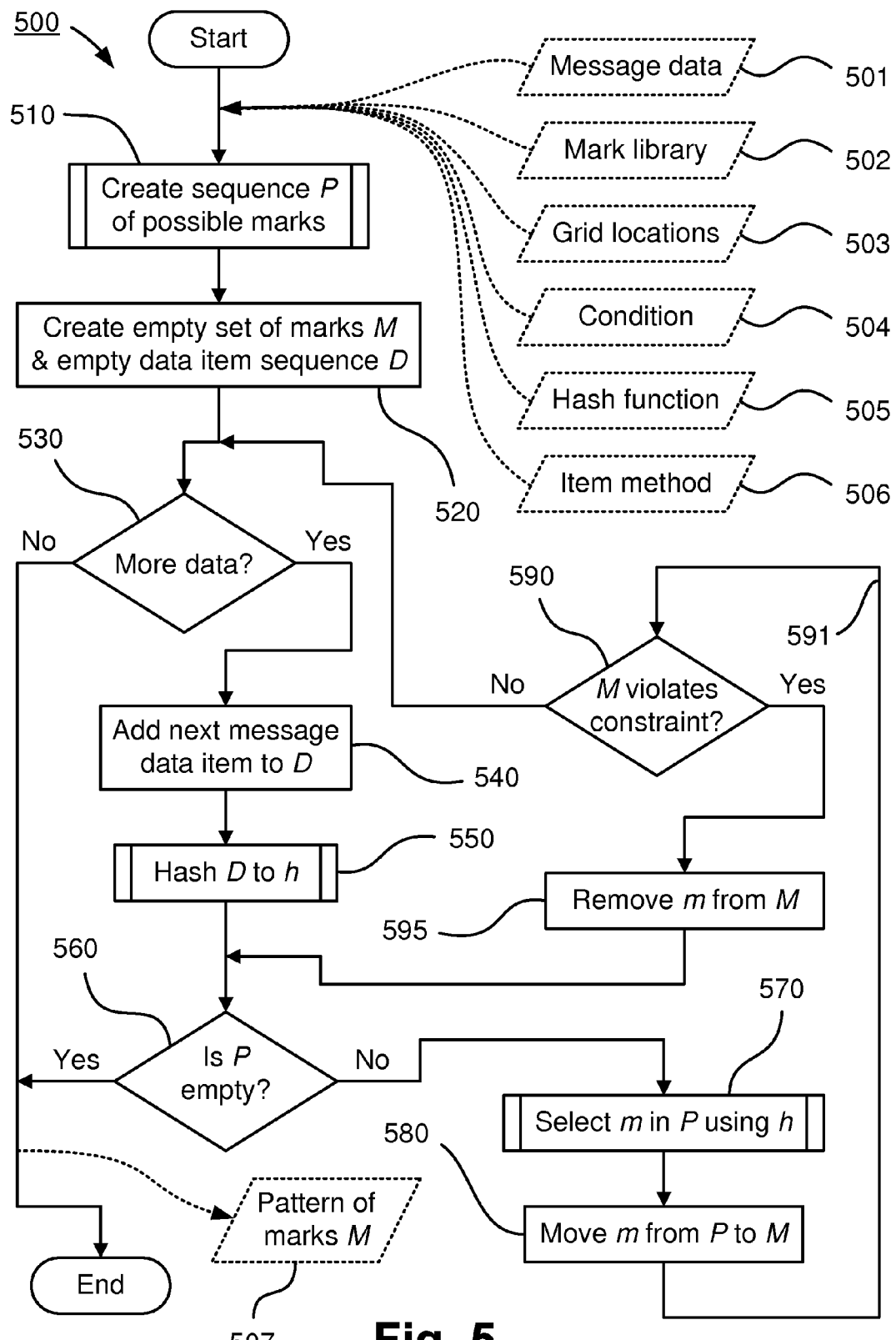
FIG. 5 is a schematic flow diagram for a method of encoding a message into a CBC using a blue noise pattern of marks.

As a precursor in the described example in FIG. 5 a message 501, a mark library 502 (or equivalently, a method for defining marks), information 503 defining the grid, a predetermined condition (i.e., a constraint) 504, a hash function 505, and a method 506 for defining how to partition the message into data items are provided. In this arrangement, the pseudorandom nature of the process arises from the application of the hash function 505, and the defined constraint 504 is the predetermined condition.

The method 500 then begins at an initial step 510 where a sequence P of possible marks is created. Specifically, the members of P comprise all unique combinations of a mark type (defined by the mark library 502) and a mark location (defined by the grid information 503).

In the simple case illustrated in FIG. 2, only one type of mark (a dot) is used. In this case, step 510 of the method 500 may be accomplished by:
1. first creating an empty sequence P; and
2. second, for each grid location $(x, y)_n$, the grid being defined by the grid information 503, adding to the sequence P a mark associated with the location $(x, y)_n$. The aforementioned association of sequence members with grid locations is based upon "row-major order" (left-to-right in each horizontal row and top-to-bottom by row.

The CBC arrangements may also be practised using a plurality of different marks rather than using only one type of mark as described with reference to the preferred CBC arrangement. This alternate approach of using a plurality of different marks is easily accomplished by modifying the step 510 so that:
1. an empty sequence P of marks is first created; and
2. then, for each grid location $(x, y)_n$, the grid being defined by the grid information 503, adding to the sequence P each one of the plurality of different marks, associated with the location $(x, y)_n$. There is no need for selection here as every one of the marks is added to P at each grid location.

In a next step 520, an empty sequence D of data items and an empty set M of marks are created. As described in detail below, the initially empty sequence D will be used in subsequent steps of the method 500 to contain successively longer sequences of data items. Similarly, in subsequent steps of the method 500 marks will be added to the initially empty set M of marks such that upon completion of the method 500, the set M of marks will comprise the desired pattern of marks encoding the message. In a manner corresponding to that applied to the sequence P of marks, each member of the set M of marks is associated with associated a mark type and a grid location $(x, y)_n$.

Steps 530 to 595 of the method 500 illustrated in FIG. 5 iteratively add marks to the set M.

In a step 530, if all data items of the message have been used, then the method 500 concludes, and outputs a pattern of marks M (i.e., 507). In this case, the set M may not be maximal.

As noted previously, in the preferred CBC arrangement it is typically desired to encode data in a maximal blue-noise distribution, where all valid mark locations are occupied. To achieve this, the message data may be extended appropriately in a number of ways. Examples include:
1. appending empty data items;
2. appending data items with known values; or
3. simply repeating the original message or parts thereof as many times as necessary.

If there is more message data available to be encoded, then the method 500 proceeds to a step 540.

In the step 540, the next message data item is obtained in accordance with the data item method 506 and appended to the sequence D.

In a following step 550 of the method 500, the sequence D is "hashed" to produce a hash value h. Many methods of determining a "hash" value are known in the art and any one or more of the known techniques may be used to determine a hash value h. Preferentially, however, this is done by:
1. first converting the sequence D to an equivalent character sequence S;
2. then applying to S a cryptographic hashing function such as the "Secure Hash Algorithm" SHA-256, published by the U.S. National Institute of Standards and Technology (NIST); and
3. optionally, truncating the resulting hash value (to the low-order 32 bits, for example) to facilitate subsequent computation.

The above step no. 1 of converting the sequence D to an equivalent character sequence may be accomplished, for example, by forming a binary sequence by concatenating the binary data items in D and then substituting the characters '0' and '1' for numerical bit values 0 and 1, respectively.

Following the step 550, the method 500 proceeds to a step 560.

In the step 560, if the sequence P of possible marks, created previously in the step 510, is empty, then the set M is maximal and method 500 concludes and outputs the pattern of marks M (i.e., 507).

If the sequence P is not empty, then the method 500 proceeds to a following step 570.

In the step 570, one mark m in P is selected on the basis of the hash value h. In the preferred CBC arrangement, the i'th element of P is selected, with i calculated from h, according to Formula (3), below:

$$m=P_i:i=h \bmod \mathrm{length}(P) \quad (3)$$

where:
h is taken as an unsigned binary integer;
mod is the modulus operation; and
length(P) is the number of remaining elements in the sequence P.

In the present example, the hash value h comprises a sequence of 32 bits. As can readily be appreciated, for optimal performance it is desirable that the range of the h values is sufficiently large that the probability of selecting each available mark (i.e., member of the sequence P associated with a corresponding grid location $(x, y)_n$) is substantially uniform.

In a next step 580, the mark m is removed from the sequence P and added to the set M. Following the step 580, the method 500 proceeds to a step 590.

In step 590, if the set M satisfies the constraint (i.e., C(M) is true), then the method 500 returns to the step 530 to continue with the next iteration.

Alternatively, if the set M violates the constraint (i.e., C(M) is false), then the method 500 proceeds to a step 595.

In the step 595 of the method 500, the mark m is removed from the set M. This will return the set M to the same state as at the start of the iteration. Nevertheless, the mark m will have been removed from the sequence P and will no longer be available for selection.

Following the step 595 the method 500 returns to the previous step 560.

Simple Example of Encoding

By way of further explanation, an example of encoding a message into a pattern of marks will now be described. Specifically, this example uses:

1. a message 501 comprising a string "CBC" ("1000011 1000010 1000011" in binary, according to the ASCII code), extended with binary '0' as required;
2. marks comprising a plurality of identical simple dots, as defined by the mark library 502;
3. a 15×15 square grid of possible mark locations $(x, y)_n$, defined according to the grid information 503;
4. an exclusion radius $r_e$ of 3.4 times the grid spacing, according to the predetermined condition 504;
5. a hash function comprising the low-order 32 bits of SHA-256, according to the hash function 505; and
6. data items (defined using the data item method 506) of two bits per mark ("10", "00", "01", "11", etc.).

More specifically:

1. the sequence P created in the first step 510 of the method 500 comprises single dots at each grid location from (0, 0) to (14, 14) in row-major order ((0, 0), (1, 0), ..., (13, 0), (14, 0), (0, 1), (1, 1), etc.);
2. in step 520, the set of marks M and data item sequence D are created with values { } and ( ) respectively;
3. in step 530, the "More data?" condition is always true as the message being encoded is extended indefinitely;
4. in step 540, the sequence D is extended by appending successive data items (thus, following step 540 the value of D is ("10") in the first iteration, ("10", "00") in the second iteration, ("10", "00", "01") in the third iteration, etc.);
5. in step 550 the concatenated data items are converted to a character string prior to hashing, as described previously (thus: "10" in the first iteration, "1000" in the second, "100001" in the third, etc.);
6. step 560 continues the iteration 225 times, until the sequence P of possible marks is exhausted; and
7. in steps 570 to 595, one mark is added to the set M for each data item added to the sequence D in step 540. These steps are detailed with respect to the placement of the first four marks in the simple example, below. Consider first the first encoding mark. In step 570:
   1. applying the SHA-256 function to the data item string "10" and taking the low-order 32 bits yields a hash value of E6AF1DD5 in hexadecimal, or 3870236117 in decimal;
   2. using Formula (3), above:
      a. the remainder of 3870236117 divided by the number of elements in P (i.e., the number of available locations: $N^2=225$ in the first iteration) is 92;
      b. m is set to the element of P with index 92 (the $93^{rd}$ element), a dot at grid location (2, 6).
   3. the dot at location (2, 6) is moved from P to m.

In step 580, the dot m at grid location (2, 6) is moved from P to M. In step 590, the "blue-noise" constraint that the new mark be more than $r_e$=3.4 grid spaces from all existing marks is satisfied trivially (there are no existing marks). Consequently, in this case the method 500 returns to step 530 to start a new iteration.

The process for placing the second mark is similar to that for the first. In step 570 in this case:

1. the string "1000" has a hash value of 56562A58 in hexadecimal, or 1448487512 in decimal;
2. the remainder of 1448487512 divided by the number of remaining elements of P (i.e., 224) is 24; and
3. m is set to the $25^{th}$ element of P, a dot at location (9, 1)

In step 580, the dot m at location (9, 1) is moved from P to M. In step 590, the constraint is still satisfied, albeit no longer trivially, and the iteration is complete.

The process for placing the third mark differs from that for the first two as the initially-chosen third mark violates the "blue-noise" constraint. Specifically, in this case step 570 is executed a first time in which:

1. the string "100001" has a hash value of DA8E8841 in hexadecimal, or 3666774081 in decimal;
2. the remainder of 3666774081 divided by the number of elements of P (i.e., 223) is 22; and
3. m is set to the $23^{rd}$ element of P, a dot at grid location (7, 1).

In the next step 580, the dot m at location (7, 1) is moved from P to M, as before. In this case, however, in step 590 the new mark is only 2 grid spaces from the existing mark at location (9, 1). Consequently, the "blue noise" constraint is not satisfied and the method 500 proceeds to step 595 where the new mark is discarded.

Following step 595, step 580 is executed to select a third mark a second time, where:

1. the hash value of 3666774081 is unchanged from the first execution in this case;
2. the remainder of 3666774081 divided by the number of remaining elements of P (i.e., now reduced by one to 222) is 81; and
3. m is set to the $82^{nd}$ element of P, a dot at grid location (8, 5).

In the next step 580, the dot m at location (8, 5) is moved from P to M. As this new mark now satisfies the "blue noise" constraint, in step 590 the method 500 returns to step 530 to complete the iteration for the third mark.

With respect to placement of the fourth mark, it will only be noted that in this case the first two marks selected violate the constraint and are consequently discarded.

To summarise, the first four data items, together with the corresponding hashed strings, the hash values in hexadecimal and the grid coordinates of the selected mark locations are shown below:

| data item | hashed string | hash value | mark location |
|---|---|---|---|
| "10" | "10" | E6AF1DD5 | (2, 6) |
| "00" | "1000" | 56562A58 | (9, 1) |
| "01" | "100001" | DA8E8841 | (7, 1) → (8, 5) |
| "11" | "10000111" | 565795EF | (10, 4) → (8, 3) → (12, 3) |

Figure 6:
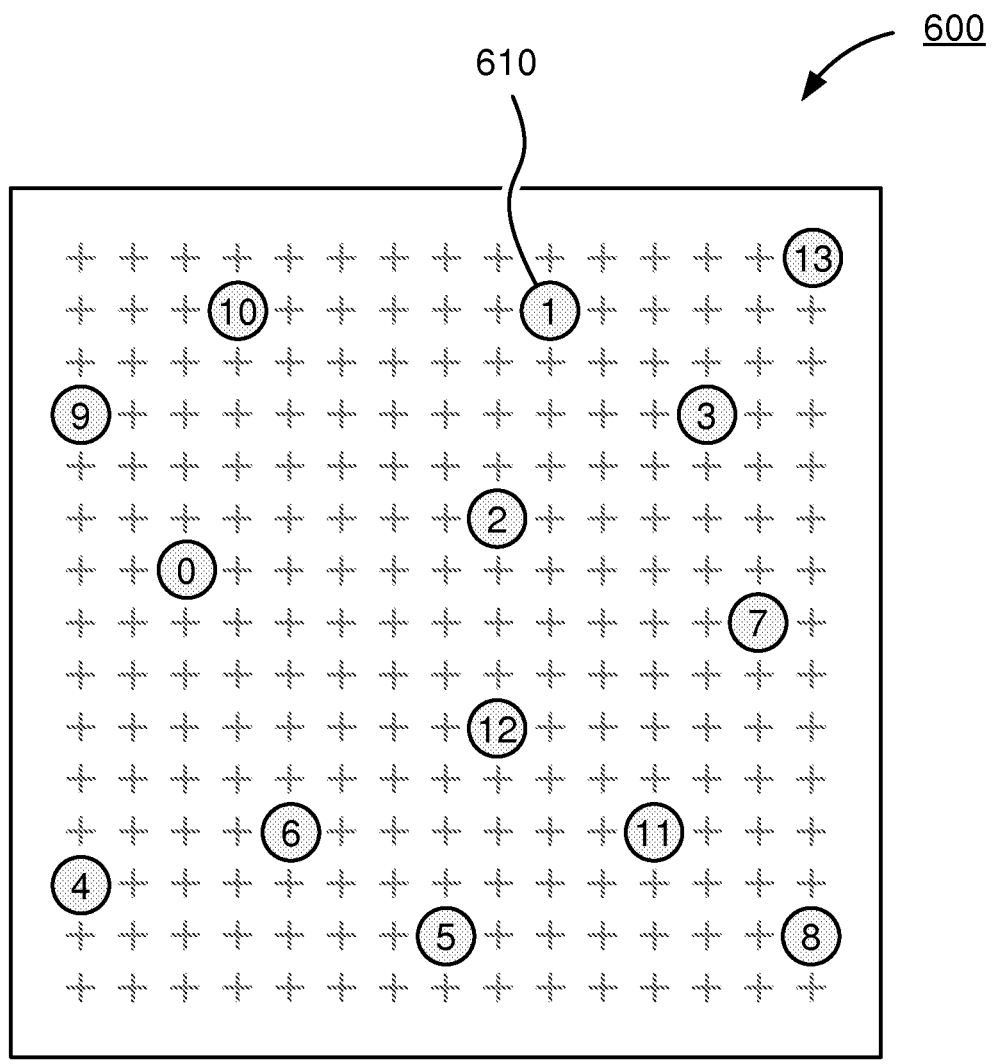
FIG. 6 shows an exemplary CBC encoding the message "CBC"

FIG. 6 illustrates the complete CBC patterns 600 generated by the simple example described above. For the purposes of this explanation only, the dots (e.g., 610) are labelled with the number of the iteration in which they were placed, starting from 0.

Decoding Data

A second object of the preferred CBC arrangement is to decode a CBC by reconstructing a recovered message which is identical to or an approximation of the encoded message corresponding to a given pattern of marks. In one CBC arrangement, decoding of data is performed using a "backtracking" algorithm. This starts with an empty sequence, and generates longer sequences by adding one of each possible piece of data, discarding sequences with high errors, and keeping sequences with low errors. The sequence with lowest error is subsequently used to reconstruct the decoded message.

The method of decoding a CBC is thus equivalent, in one example, to a method of determining the message which best reproduces the given pattern of marks. Decoding can thus be divided into two aspects:

1. determining an "error" metric (also referred to as an "error") quantifying how well a given message reproduces the pattern in question; and
2. finding the message which minimises the error.

Error Metric

The error metric, henceforth denoted $\epsilon$, may be calculated given a pattern of marks M to be decoded and a candidate message $\gamma$, according to a method 700 which will now be described with reference to the schematic flow diagram FIG. 7.

In the preferred CBC arrangement, the candidate message $\gamma$ is defined as a sequence of message data items the same as those generated according to the data item method 506 described previously with respect to FIG. 5.

In general, the candidate message may $\gamma$ be defined as a sequence of any arbitrary elements providing that the candidate message $\gamma$ may be divided or otherwise transformed into a sequence of message data items corresponding to those used in the encoding process.

In either case, it is necessary for decoding that the candidate message $\gamma$ can be converted back to the same form as the original message. In the preferred CBC arrangement where the data items are formed by dividing a binary representation of the message to be decoded into contiguous binary fragments, this is accomplished by concatenating the data items to reconstitute the message.

As a precursor, the method 700 is provided with:
1. the pattern of marks M to be decoded (i.e., 701);
2. a set of encoding parameters (i.e., 702) comprising:
   a. the mark library 502 (or equivalently, a method for defining marks);
   b. the information 503 defining the grid;
   c. the predetermined condition 504; and
   d. the hashing function 505;
3. a candidate message $\gamma$ (i.e., 703) (or equivalently, a method of generating the candidate message $\gamma$); and
4. a method 704 defining how to partition the candidate message $\gamma$ into data items corresponding to those used in the encoding process (in the preferred CBC arrangement where the candidate message is a sequence of data items, the method 704 simply returns the data items in sequence order).

The method 700 then begins at a first step 710 where a test pattern of marks T is determined from the candidate message $\gamma$ and the provided encoding parameters 702 and data item method 704 according to the method 500 previously described.

Whilst the message data 501 originally encoded, as described in regard to FIG. 5, is typically of sufficient length that a maximal pattern M is produced, the candidate message $\gamma$ may be of such insufficient length that the test pattern T calculated in the step 710 is not maximal. In this case, the candidate message $\gamma$ is denoted an "incomplete" candidate.

In a following step 720 of the method 700, the error value $\epsilon$ is initialised to 0.

Following steps 720 to 795 iterate over all the marks in T, successively adding an error value for each mark, to arrive at the total error $\epsilon_\gamma$ (i.e., 705).

In a step 730, if all marks in T have been processed then the method 700 concludes, outputting the error $\epsilon_\gamma$ (i.e., 705). Otherwise, the method 700 proceeds to a following step 740.

In the step 740 of the method 700, the next mark t to be processed is obtained from the test pattern T.

Following steps 750 to 795 of the method 700 iterate over all marks in M, successively adding to e error values calculated by comparing the type and location of each mark in the pattern M with that of the respective test mark t.

In a step 750, if all of the marks in M have been processed then the method 700 returns to the step 730. Otherwise, the method 700 proceeds to a step 760.

In the step 760, the next mark m to be analysed is obtained from the pattern M (i.e., 701).

In a following step 770, the Euclidean distance r between the locations of the mark t and the mark m is determined In a next step 780, if the mark m and the mark t are of the same type, then the method 700 proceeds to a step 790. In the example of FIG. 2, where only one type of mark is used (a dot), this will always be the case.

In the step 790, an error value $error_S$ is determined as a function of the distance r and the error value $error_S$ is added to the total error $\epsilon$.

Returning to the step 780, if the mark m and the mark t are of different types, then the method 700 proceeds to a step 795.

In the step 795, an alternative error value $error_D$ is calculated as a function of the distance r and the alternative error value $error_D$ is added to the total error $\epsilon$.

The error functions $error_S$ and $error_D$ are described in more detail below with reference to FIGS. 8 and 9 respectively.

Following either from the step 790 or from the step 795, the method returns to the step 750.

Error Functions

Having described an overview of the CBC method in regard to the error determination method 700, the error functions $error_S$ and $error_D$ used in the steps 790 and 795, respectively, are now described in more detail with reference to FIGS. 8 and 9.

For the purposes of the following description, a "search distance", $r_s$ will be defined. This search distance $r_s$ is the distance within which two marks are considered to be effectively at the same location. The search distance $r_s$ is used to account for errors in the measured locations of the marks in a pattern to be decoded. In the preferred CBC arrangement, the search distance will typically be substantially smaller than the exclusion radius $r_e$. A value of $r_e/6$ is used for the search distance $r_s$ in the following description.

As too low a value of $r_s$ will make the error calculation noisy, while too high a value will reduce the achievable data capacity, in the preferred CBC arrangement, an optimal value of $r_s$ is determined empirically by testing a range of values and selecting the one yielding the best system performance.

The function $error_S$, used when the two marks being compared are of the same type, is described first.

Figure 8:
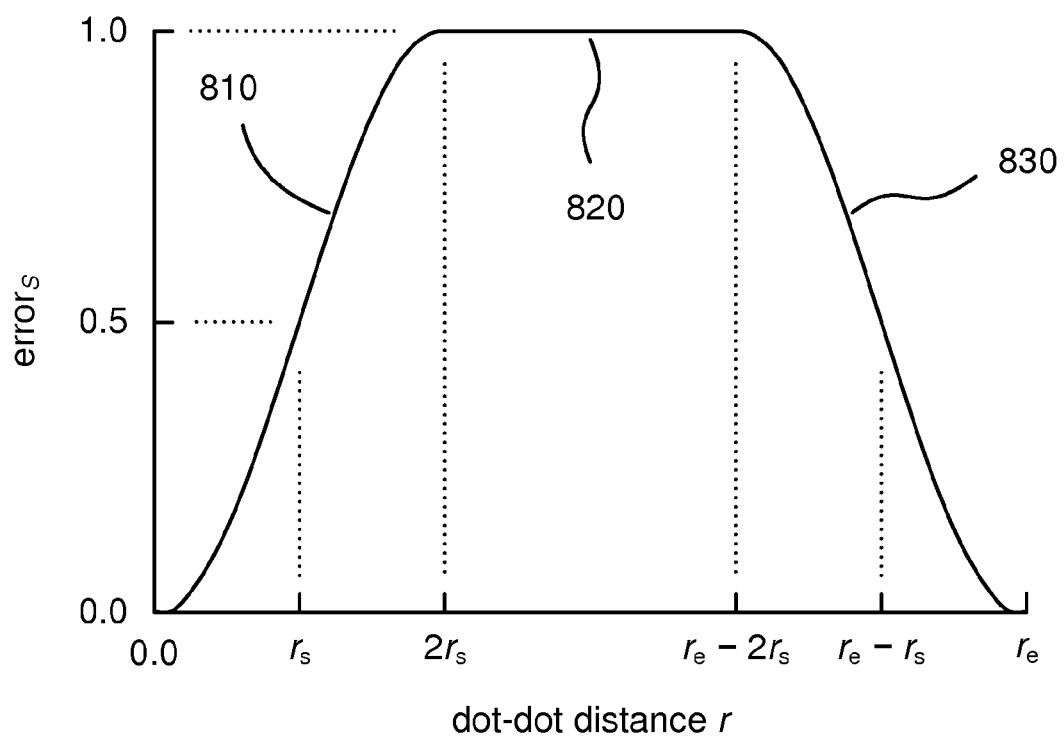
FIG. 8 shows a univariate error function used in determining the error for a candidate message where two marks being considered are of the same type.

As shown in FIG. 8, the $error_S$ function of the preferred CBC arrangement, used to establish the error in regard to two marks of the same type, comprises four segments. In order of increasing distance r the first three segments are: a "raised cosine" rising edge 810, a constant plateau 820, and a "raised cosine" falling edge 830. Beyond the falling edge, the function $error_S$ has a constant value of 0. Specifically, in the preferred CBC arrangement the $error_S$ function is defined according to according to Formula (4) as follows:

$$error_S(r) = \begin{cases} \frac{1}{2}\left(1 - \cos\left(\frac{\pi r}{2r_s}\right)\right) & \text{where } r < 2r_s, \\ 1 & \text{where } 2r_s \le r \le r_e - 2r_s, \\ \frac{1}{2}\left(1 - \cos\left(\frac{\pi(r_e - r)}{2r_s}\right)\right) & \text{where } r_e - 2r_s < r < r_e, \\ 0 & \text{otherwise.} \end{cases} \quad (4)$$

Figure 9:
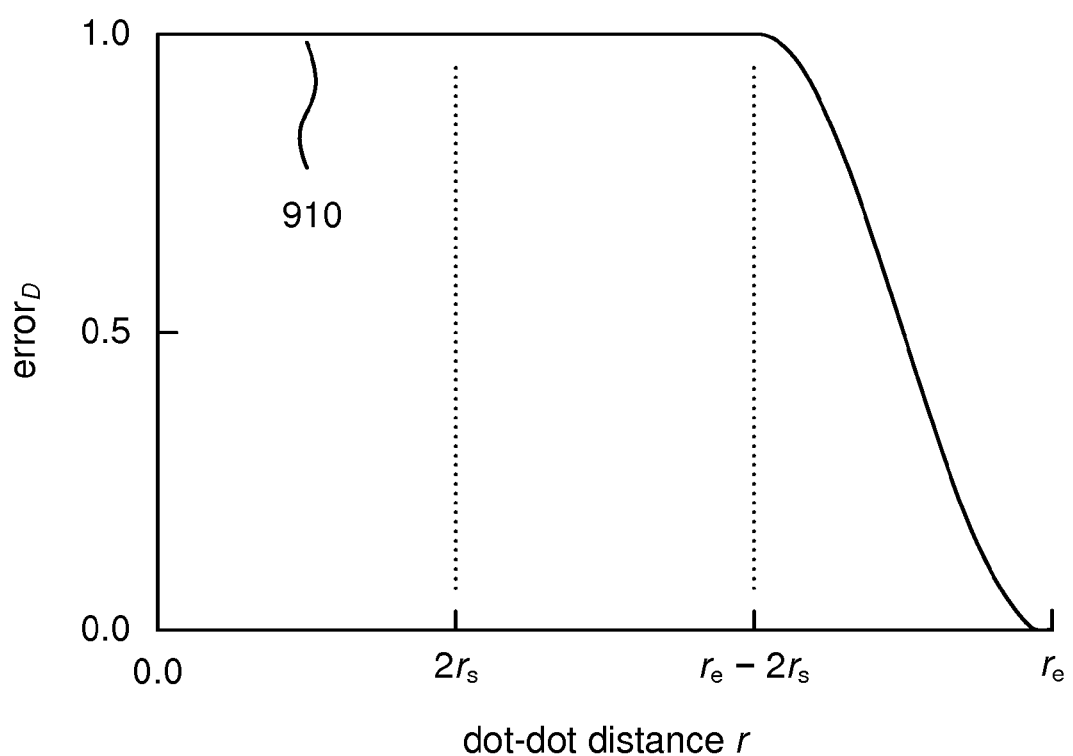
FIG. 9 shows a univariate error function used in determining the error for a candidate message where two marks being considered are of different types.

Turn now to FIG. 9, which illustrates the function $error_D$. This function is used when the two marks being compared are of different types, and is similar to the $error_S$ function previously described. In the preferred CBC arrangement, the two functions differ only in the first segment 910, where in place of a rising edge, $error_D$ has a constant value of 1.

Specifically, the $error_D$ function may be calculated according to Formula (5), below:

$$error_D(r) = \begin{cases} 1 & \text{where } r \le r_e - 2r_s, \\ \frac{1}{2}\left(1 - \cos\left(\frac{\pi(r_e - r)}{2r_s}\right)\right) & \text{where } r_e - 2r_s < r < r_e, \\ 0 & \text{otherwise.} \end{cases} \quad (5)$$

Error Map

Figure 10:
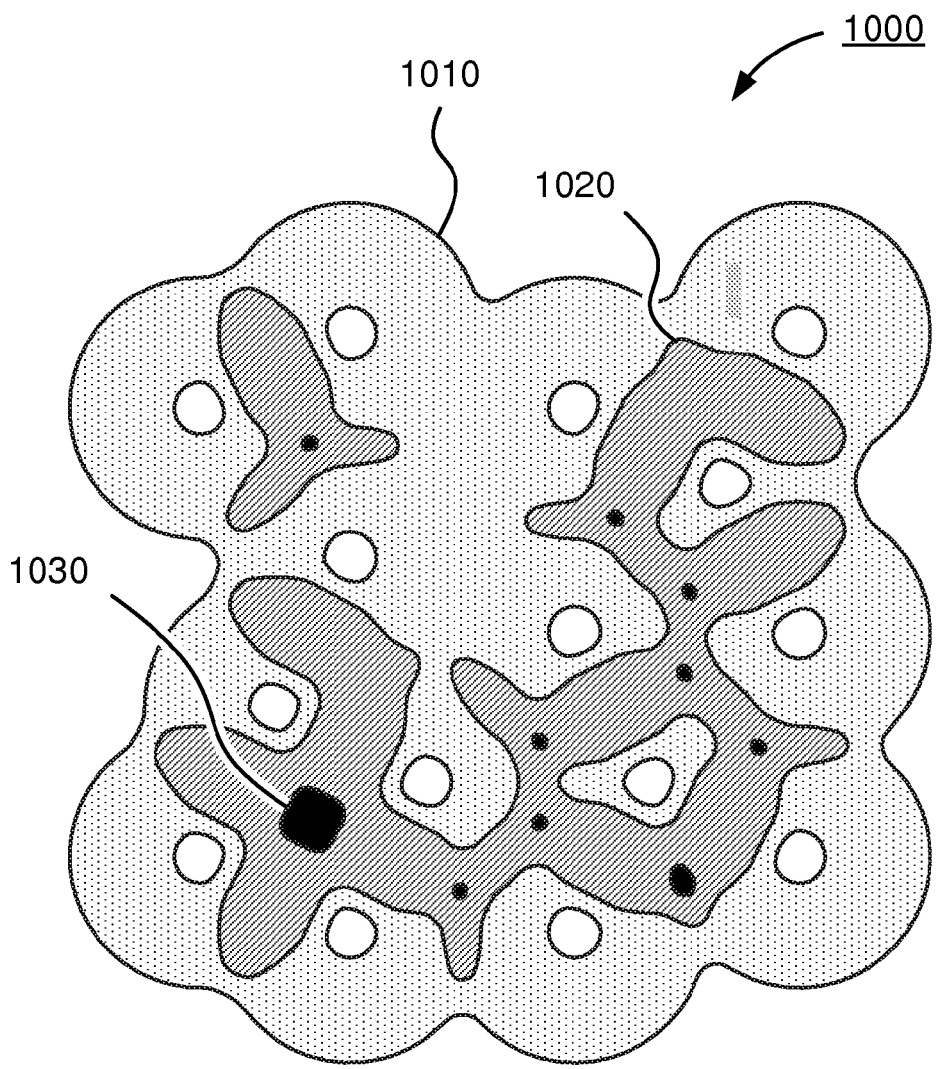
FIG. 10 is a contour plot of an error map.

Referring once more to FIG. 7, it can be appreciated that in cases such as that shown in FIG. 2, where all marks are of the same type, the calculation accomplished by the steps 750 to 790 in FIG. 7 is equivalent to adding to the total error $\epsilon$ values derived from a two-dimensional error function of the test mark t location. In the present CBC arrangement, this error function or "map" may be determined from the mark pattern M to be decoded. FIG. 10 shows a contour plot 1000 at the levels 0.5 (1010), 1.5 (e.g., 1020) and 2.5 (e.g., 1030) of the error map for the example of FIG. 2. As can be seen, the locations of the marks in M have a low error and locations between marks (1030 in particular) have a high error.

Decoding Algorithm

Figure 11:
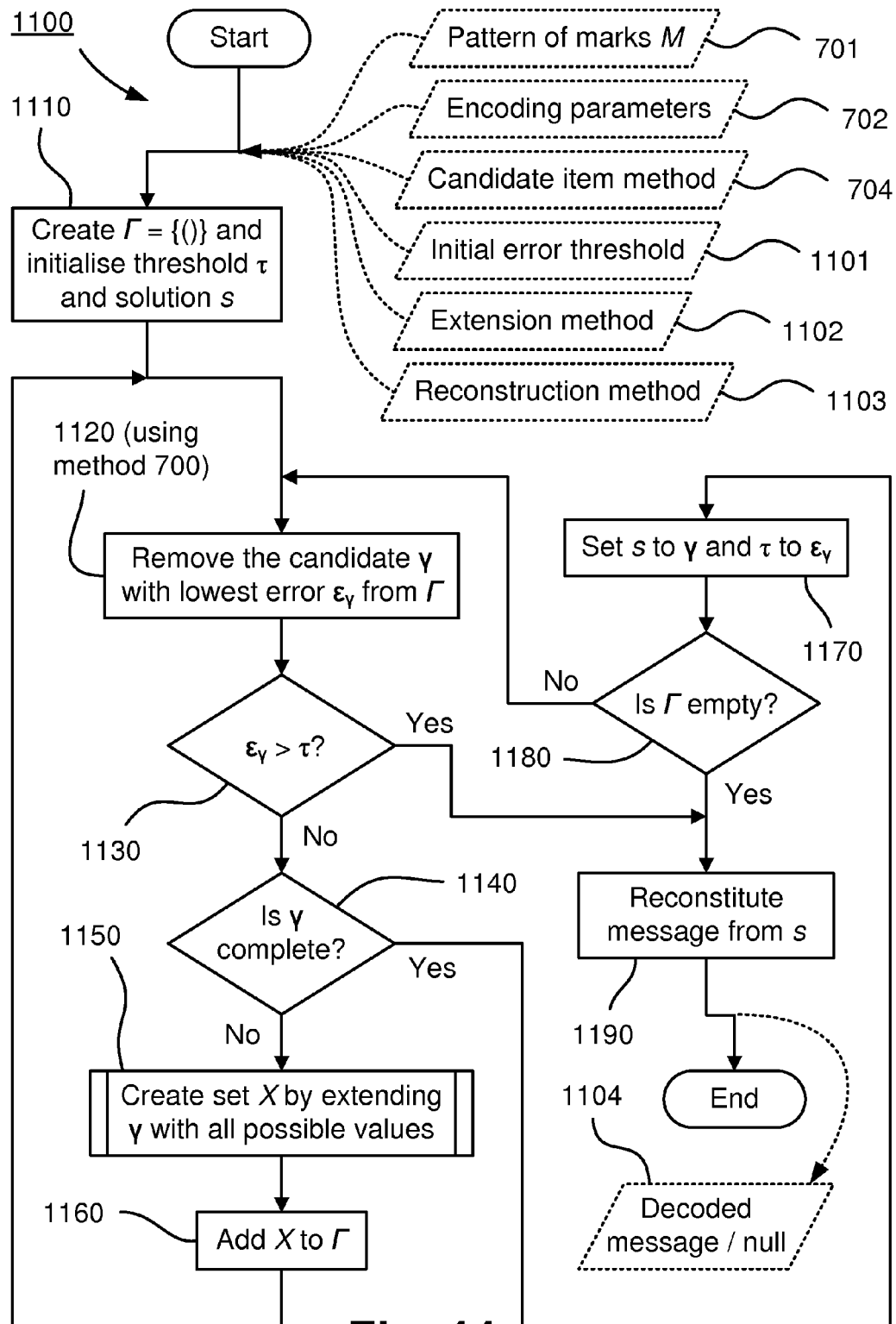
FIG. 11 is a schematic flow diagram for a method of finding a message which minimises the error with respect to a given pattern of marks.

Having described the determination of the error metric $\epsilon_\gamma$ given a mark pattern M and a candidate message $\gamma$, a method 1100 of finding the message data 1104 which minimises the error (which should be identical to or an approximation of the encoded message data 501) is now described with reference to FIG. 11.

As a precursor, the method 1100 is provided with a pattern of marks M to be decoded 701, encoding parameters 702, a candidate data item method 704, a predetermined threshold value 1101 for an error threshold $\tau$ (or equivalently a method for determining the predetermined value), a method 1102 for extending a candidate message $\gamma$ with all possible next elements, and a method 1103 for converting a candidate message $\gamma$ into a decoded message.

The method 1100 then begins at a first step 1110. As described in detail below, in the step 1100 a set $\Gamma$ of candidate messages, the error threshold $\tau$ (also referred to as the "current error threshold") and a current solution s are initialised The set $\Gamma$ as initialised in step 1110 contain one member, namely an empty sequence. This is the root sequence of all possible candidate messages and, according to the method 700 described previously, has a total error $\epsilon$ of 0. The set $\Gamma$ is not all possible candidates, but rather just the current set of candidates (initially $\{\,(\,)\,\}$).

The error threshold $\tau$ is initialised in step 1110 according to the input 1101. The input value 1101 may be $\infty$, in which case the method 1100 will yield the candidate with the lowest error, however high this error may be. Alternatively, the input 1101 may be a predefined finite value, in which case the method 1100 will yield a candidate message only if there exists a candidate message with an error less than or equal to the predefined value 1101.

At any subsequent point in the method 1100, the current solution s holds the candidate with lowest error (the "best" solution) identified thus far. In step 1110 the current solution s is initialised to a null value to indicate that no solution has yet been found.

In a next step 1120 of the method 1100 the candidate message $\gamma$ (from the set $\Gamma$ of candidate messages) with an associated (least) error $\epsilon_\gamma$ (as determined according to the method 700 in FIG. 7 using the provided pattern of marks to be decoded 701, encoding parameters 702 and data item method 704), this being referred to as the current candidate message, is removed from the set $\Gamma$.

It is not necessary that the error be determined for each candidate message $\gamma$ at this time. In the preferred CBC arrangement, the error $\epsilon_\gamma$ of each candidate message $\gamma$ is determined when the candidate message $\gamma$ is created in a step 1150, described below.

In a following step 1130, if the error $\epsilon_\gamma$ for the current candidate message $\gamma$ in question is greater than the current threshold $\tau$ then the method 1100 proceeds to a step 1190, described below, where the current solution s is transformed into the final decoded message. In general, using the method 700, the error cannot decrease as a candidate message $\gamma$ is extended by concatenation of additional data units. In this case, therefore, it may be safely concluded that no further candidate messages $\gamma$ will be identified with an error less than the current threshold $\tau$.

If $\epsilon_\gamma$ is less than or equal to $\tau$ then following the step 1130 the method 1100 proceeds to a step 1140.

In the step 1140, if the pattern generated using the method 500 from the candidate message $\gamma$ is maximal ($\gamma$ is a "complete" message), then the method 1100 proceeds to a step 1170. Otherwise, $\gamma$ is incomplete and the method 1100 proceeds to a step 1150.

In the case where the current candidate message $\gamma$ is incomplete, in the step 1150 a set X of new candidate messages is created by appending each possible next data item to the current candidate message $\gamma$ according to the method 1102. For example, if the current candidate message $\gamma$ is the sequence (0, 1, 0), and the set of possible values of the next data item is $\{0, 1, 2\}$, then the resulting set X would be $\{(0, 1, 0, 0), (0, 1, 0, 1), (0, 1, 0, 2)\}$. As noted above, in the preferred CBC arrangement the errors of each new candidate are also be determined at this point using the method depicted in FIG. 7.

In a next step 1160 each new candidate message element of the set X is added to the set $\Gamma$.

Following the step 1160 the method 1100 returns to the previous step 1120 to complete the iteration.

Returning to the step 1140, in the case where the current candidate message $\gamma$ is complete the method 1100 proceeds to a step 1170 where a current solution s is set to the current candidate message $\gamma$ and the threshold $\tau$ is set to $\epsilon_\gamma$.

Following the step 1170, the method 1100 proceeds to a step 1180. In the step 1180, if the set of remaining candidate messages $\Gamma$ is empty then the method 1100 proceeds to step 1190. Otherwise the method 1100 returns to the previous step 1120 to complete the iteration.

In the final step 1190 of the method 1100, one of two cases may hold. Either a solution was found, in which case s will hold the solution sequence, or no solution was found, in which case s will be a null value. If no solution was found then in step 1190 the decoded message 1104 is set to a null value. Alternatively, if a solution was found, then in step 1190 the solution s is translated into the decoded message 1104 according to the method 1103. As described previously with respect to FIG. 7, in the preferred CBC arrangement this is accomplished by concatenating the sequence of binary data items constituting the solution s to reconstitute the original form of the message (e.g., 7-bit ASCII characters).

Following the step 1190, the method 1100 concludes.

Error Behaviour

One notable consequence of the encoding method 500, whereby the selection of a mark in the step 570 depends sensitively upon all of the data used up that point, is that a decoded message 1104 returned by the decoding method 1100 is divided into two parts, namely:

1. an initial segment comprising data identical to the corresponding data of the message 501 originally encoded; and
2. a subsequent segment comprising a random data unrelated to the corresponding original message 501 data.

In other words, the decoded message begins with correct data, and all subsequent data is random.

In this system there is thus no requirement for error correction. Rather, this aspect of this CBC arrangement may be advantageously exploited by:

1. ordering the message data 501 to place more important information toward the start of the message 501 and less important information toward the end; and
2. incorporating some means, such as known data placed at intervals within the message 501, to identify the point at which the original message data is lost.

Theoretical Data Capacity

Any encoding scheme will be limited in the quantity of data that may be successfully stored and retrieved.

The question of limits on the size of the data items that can be encoded using the method 500 will now be discussed with reference to FIGS. 12 and 13.

As the CBC arrangements described below typically utilise only one type of mark, the following discussion is limited to such examples.

As regards the alternate case where multiple types of marks are used, it will be readily appreciated that if the number of mutually distinguishable marks used is $\mu$, then the additional data capacity compared to the case where only one mark type is used will be approximately $\log_2(\mu)$ bits per mark.

Figure 12:
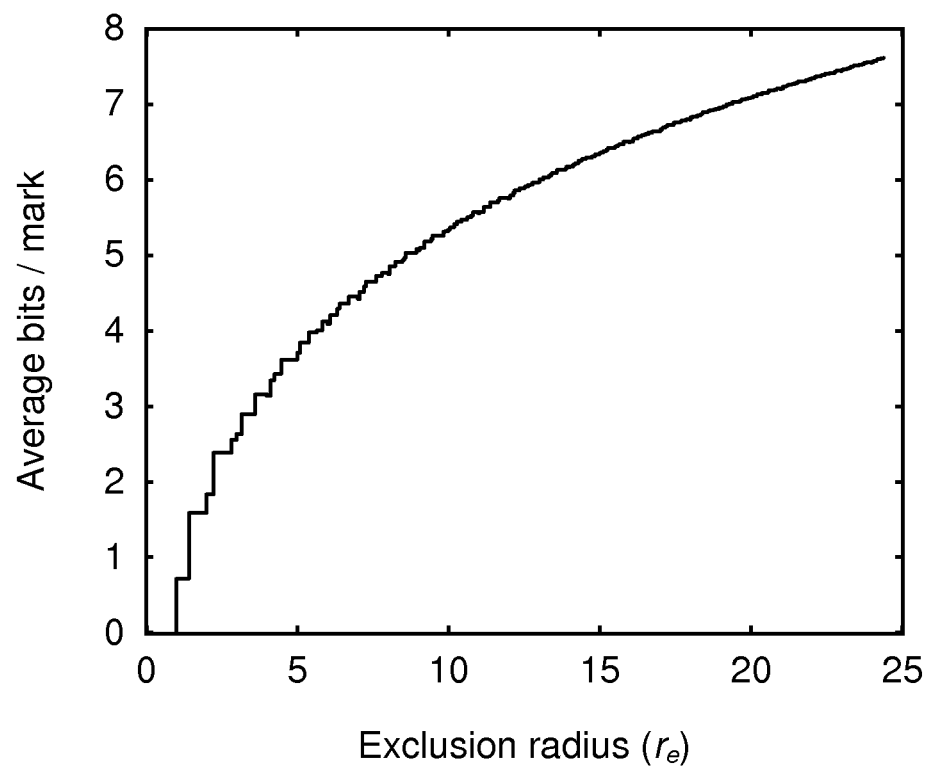
FIG. 12 shows the relationship between the exclusion radius, and the average size of data items making up the message to be encoded, which are capable of being encoded.

Refer first to FIG. 12, which illustrates the relationship between the exclusion radius, $r_e$, and the average size of the data items capable of being encoded using the method 500. This curve has been determined assuming that the possible locations $(x, y)_n$ are arranged on a large uniform square grid with grid spacing 1.

More generally, the data capacity of the present CBC arrangement is related to the number of distinct mark configurations available. In the case where marks may be placed at arbitrary locations in an area, without regard, for example, to a particular grid, and where translation of a mark by a distance $\Delta$ may be reliably detected, the effective exclusion radius, $r_e'$, as regards FIG. 12, can be approximated according to Formula (6), below:

$$r_e' \approx \frac{r_e}{\Delta} \tag{6}$$

Figure 13:
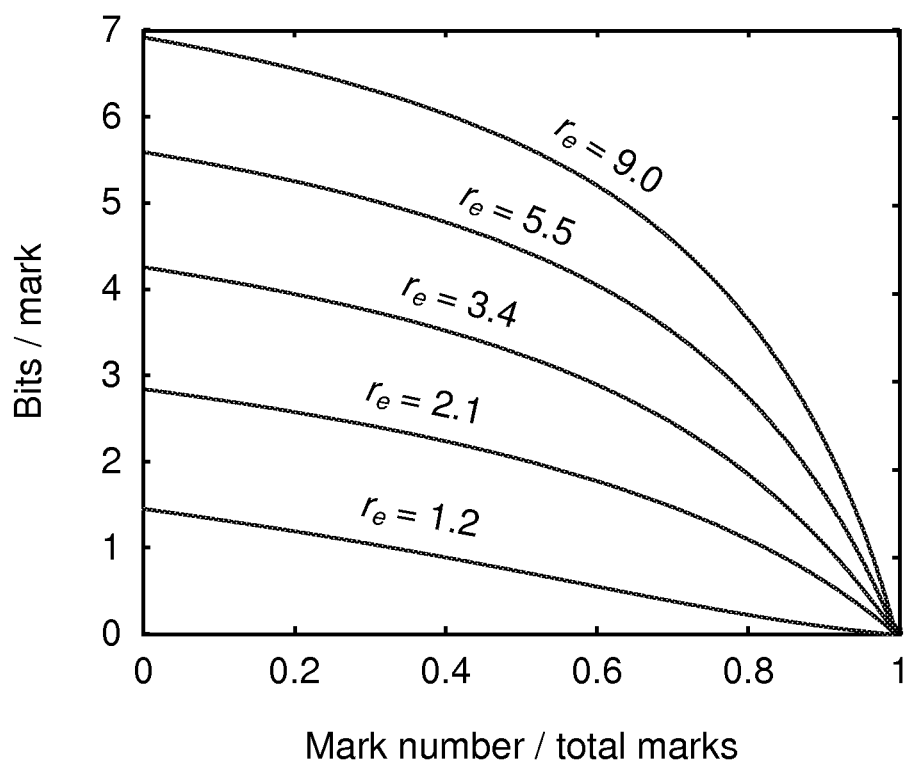
FIG. 13 shows the variation in theoretical data capacity as a function of mark sequence order for selected exclusion radii.

Turning now to FIG. 13, it will also be appreciated that during the iterative creation of a CBC pattern, any previously-placed marks will constrain the locations at which a new mark may be placed. The method 500 will thus have more freedom to place marks in early iterations compared to later iterations.

FIG. 13 illustrates this relationship and shows the variation in theoretical data capacity as a function of mark sequence order (0 corresponding to the first-placed mark and 1 to the last-placed mark) for selected exclusion radii. As in FIG. 12, the illustrated curves correspond to the limiting case of a large grid area.

Practical Data Capacity

The theoretical data capacity described previously will not in general be achievable in practice. Furthermore, the actual data capacity utilised may deliberately be reduced below the theoretical limit in order to:

1. improve the stability or speed of decoding;
2. account for factors such as noise in the measured mark positions, missing marks or extraneous marks; or
3. accommodate specific encoding schemes.

Figure 14:
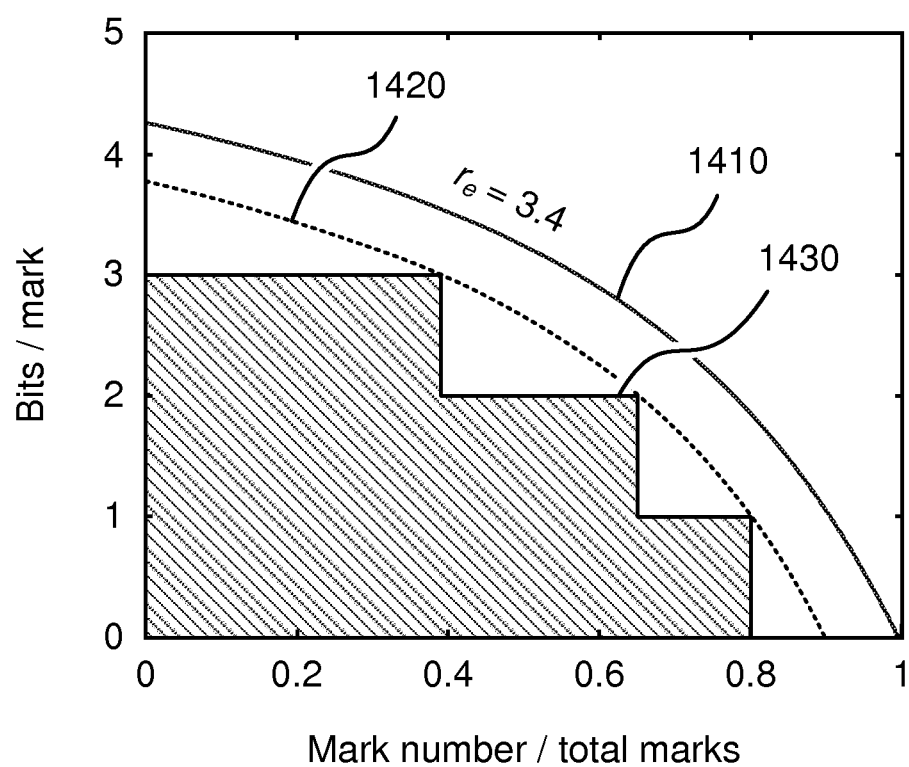
FIG. 14 shows an example of the actual data capacity available, accounting for (a) derating of the theoretical limit for improved stability; and (b) limiting encoding to an integer number of bits per mark only.

FIG. 14 illustrates such a situation. In order to enhance system stability or error performance, the theoretical limit (curve 1410) may be shifted down to form a "stability curve" 1420. In practice, the amount by which the theoretical curve 1410 is shifted to form the stability curve 1420 may be established by trying a range of values with the specific implementation being used and determining the least shift yielding the desired behaviour.

Assuming that it is desired to use a specific encoding scheme, the stability curve 1420 may be further modified to form a "data capacity" curve (e.g., 1430) to be used in practice. In the example of FIG. 14, only integral numbers of bits are encoded per mark and the curve 1430 bounded by curve 1420 may be used to determine the number of bits to be encoded in a given mark.

In accordance with the curve 1430, in this example the first marks to be placed may thus be encoded with 3 bits per mark, while later marks may use only first 2 and then 1, and still later marks no data at all.

Figure 15:
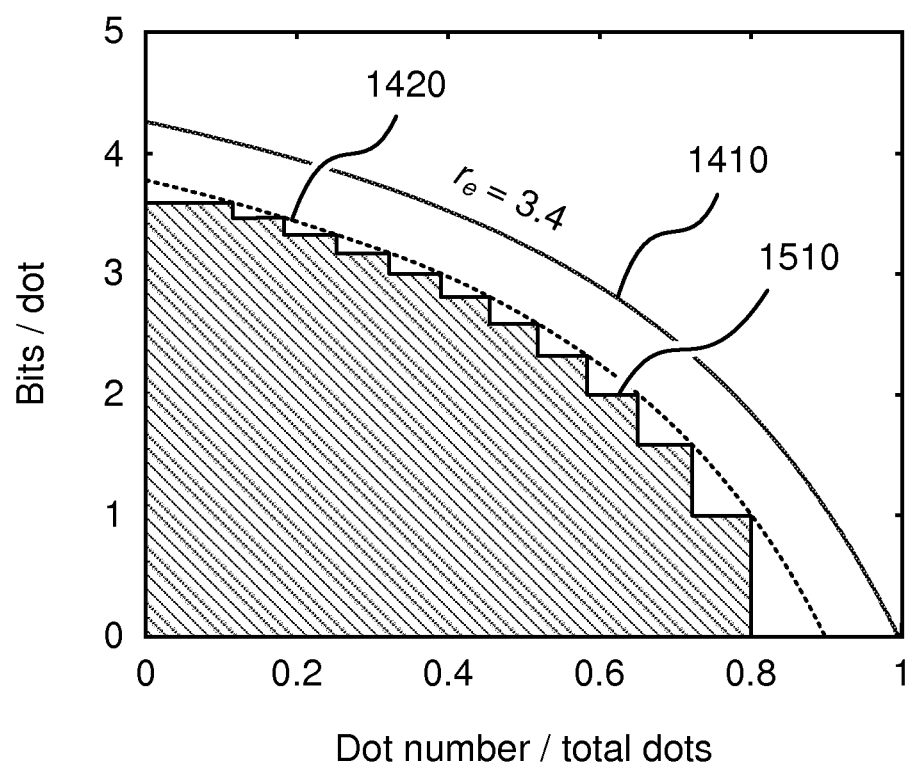
FIG. 15 illustrates an alternative encoding scheme including an expanded range of encoded values.

Turn now to FIG. 15, which illustrates an alternative encoding scheme including an expanded range of encoded values. In the case shown, the area of a data capacity curve 1510 is increased relative to the previous example 1430 by allowing marks to be encoded with ranges of values other than integer powers of 2. In the alternative encoding scheme illustrated in FIG. 15, the first marks each encode one of 12 possible values, while later marks encode values spanning ranges decreasing from 11 down to 2.

It will be apparent to one skilled in the art that many variations of such schemes may be used. One further example would be to encode two or more marks using the same data item. Using such methods, the data capacity curve can be made arbitrarily close to the stability curve at the expense of additional computation.

Finally with respect to data capacity, it should be noted that, in contrast to the examples given previously, it is not necessary for stability that the data capacity curve (e.g., 1510) lie strictly below the stability curve (e.g., 1420). Rather, it is only required that the data capacity curve lie below the stability curve on average.

Additional Requirements for Practical Decoding

In order to recover information previously encoded using the CBC arrangements described, the grid locations and types of the encoded marks (e.g., 701 in FIG. 7) must be known.

Referring once again to FIG. 2, if the basic pattern 200 as previously described was simply printed on a document, although the dots might be readily located and the exclusion radius, length and spacing of the grid axes be previously known, a wide range of possible axis origins and orientations may still be consistent with a given dot arrangement and unambiguous decoding of the CBC would consequently be difficult or impossible.

A third object of the CBC arrangements is to facilitate decoding by providing methods of determining the required grid locations.

Two specific examples in which this information may be readily obtained are now described. The first example is a method of "watermarking" an image and the second example is a method of encoding data in a document using low-visibility dots.

Watermarking Example

Methods of storing information in an image by means of a CBC watermark are now described with reference to FIGS. 16 to 24.

Figure 16:
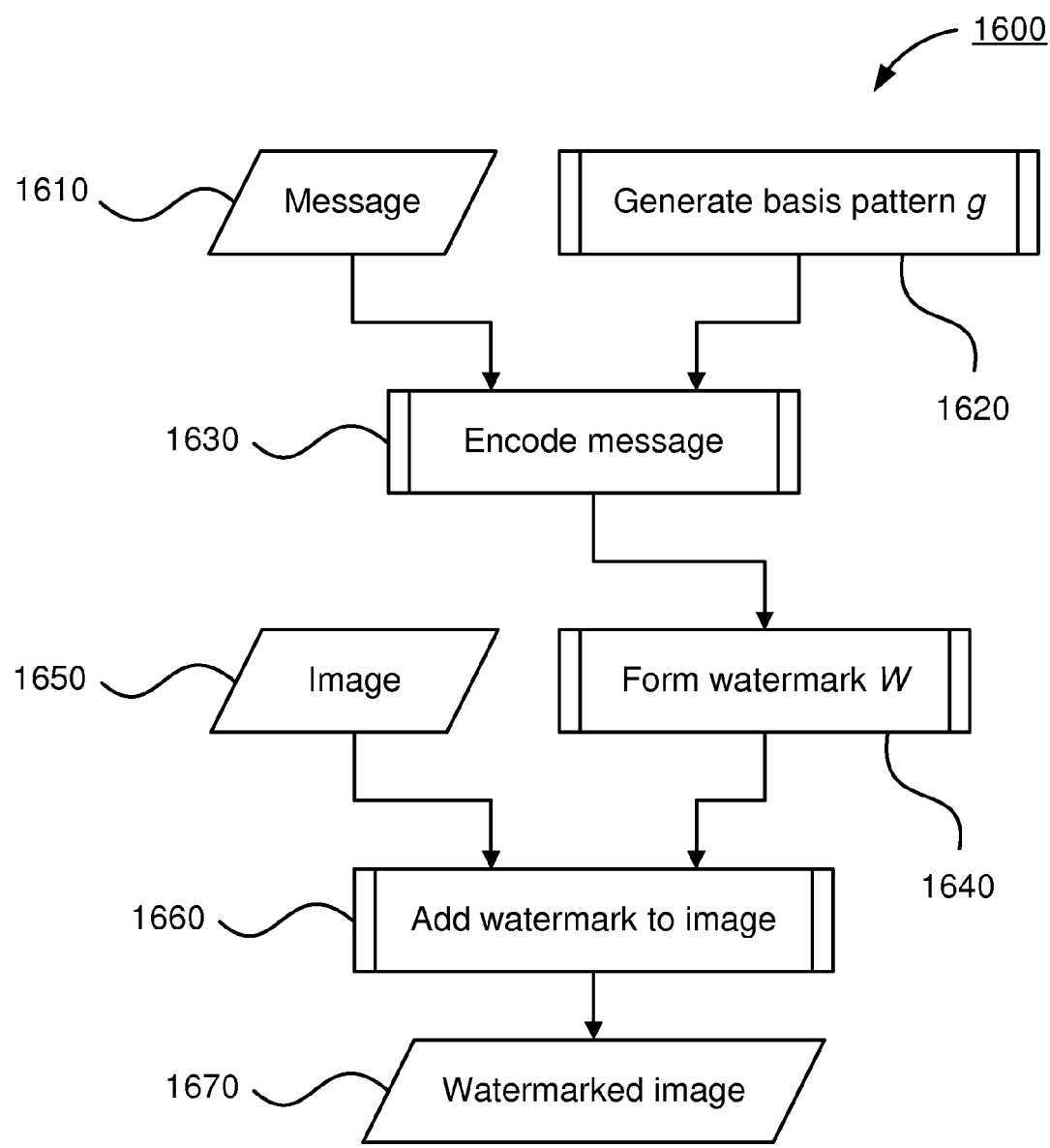
FIG. 16 shows a schematic data flow diagram of a process of watermarking an image with an encoded message.

Refer first to FIG. 16, which shows a schematic data flow diagram of a method 1600 of encoding a message 1610 into an image 1650 through the addition of a watermark W to the image 1650 to form a watermarked image 1670.

Basis Pattern

The watermark W is formed from a basis pattern g. This basis pattern will form the marks used to encode the message and is determined in a step 1620 of the method 1600.

Figure 17:
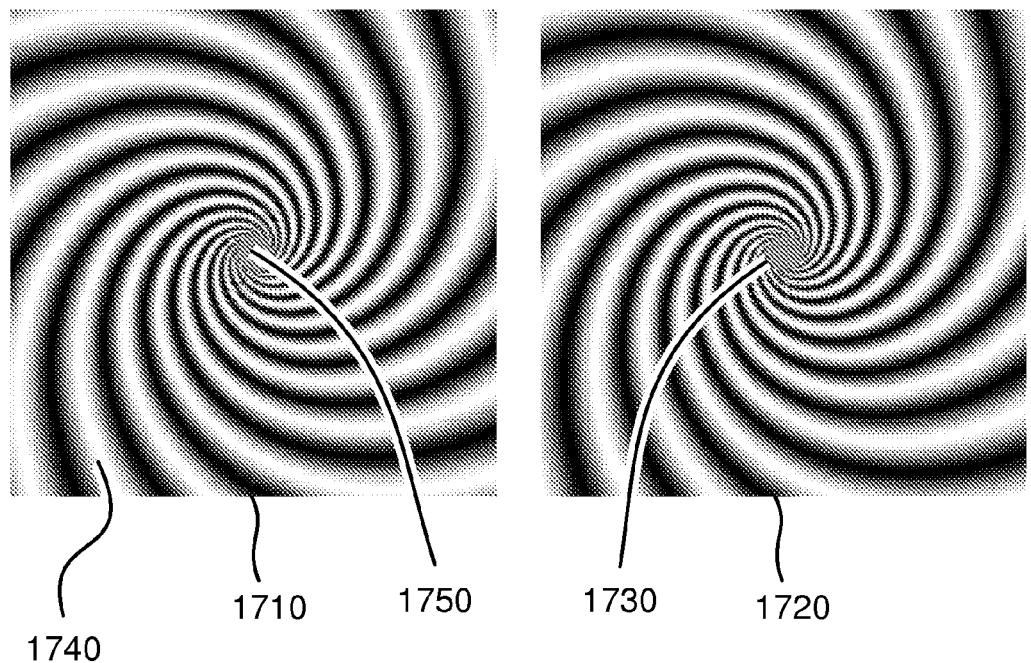
FIG. 17 shows the real and imaginary parts of a typical basis pattern of a preferred form.

In the preferred CBC arrangement of this example, the basis pattern g is a logarithmic radial harmonic function (LRHF). Mathematically, an LRHF is a complex-valued function defined on a plane. As an example, FIG. 17 shows an illustration of the real 1710 and imaginary 1720 parts of an LRHF. Advantageously, an LRHF has the properties of scale and rotation invariance, which means that if an LRHF is transformed by scaling or rotation the transformed LRHF is still an LRHF.

An LRHF has three parameters that may be adjusted. The first parameter is referred to as the Nyquist radius R, which is the radius at which the frequency of the LRHF becomes greater than $\pi$ radians per pixel (e.g., 1730). The second parameter is referred to as the spiral angle $\sigma$. This is the angle that the spiral arms (e.g., 1740) make with circles centred at the origin (e.g., 1750). The third parameter is referred to as the phase offset $\phi$ and is the offset parameter used in Formula (7), below.

In polar coordinates (r, $\theta$), where r is 0 at the centre of the LRHF, an LRHF may be determined from the R, $\sigma$ and $\phi$ parameters in accordance with Formula (7) as follows:

$$l(r,\theta)=e^{j(m\theta+n\ln r+\phi)} \quad (7)$$

where the values of m and n may be determined in accordance with the following Formulae (8):

$$n=R\pi \cos \sigma$$
$$m=\lfloor R\pi \sin \sigma \rfloor \quad (8)$$

The value of a pixel with coordinates (r, $\theta$) in the basis pattern g, may be determined in accordance with Formula (9) as follows:

$$g(r,\theta) = \begin{cases} \frac{\text{Re}(l(r,\theta))+1}{2} & \text{if } r > R, \\ 0 & \text{otherwise} \end{cases} \quad (9)$$

Typical values of the adjustable parameters for the basis pattern g are:
1. Nyquist radius, R=24.2;
2. Spiral angle, $\sigma$=−9.08°; and
3. Phase offset, $\phi$=0°.

Possible Mark Locations

The preferred CBC arrangement in this case employs the simple scheme described previously in relation to FIGS. 2 and 3 where marks are placed at the intersection points of a regular grid.

For the purposes of this CBC arrangement, an N×N grid will be used, with the grid positions (0, 0), (0, N-1), (N-1, 0) and (N-1, N-1) being the upper left corner, lower left corner, upper right corner and lower right corner grid positions, respectively.

Alignment Marks

An image containing a watermark to be decoded may be translated, rotated, scaled or sheared compared to the image originally watermarked. To facilitate the correction of any such distortions, marks are placed at previously defined locations relative to the marks encoding the message. These "alignment marks" are described in more detail below.

In the preferred CBC arrangement, grid positions (0, 0), (0, N-1) and (N-1, 0) are reserved for alignment marks, and grid position (N-1, N-1) is kept open, as a mark at that position will render the correct orientation ambiguous. That is, the orientation of the grid will not be easy to identify if all four grid positions are occupied by an alignment mark, and hence the orientation will be ambiguous unless further information is added, in order to explicitly indicate the orientation of the grid upon which the marks are placed. By only recording three of the four possible alignment marks, the orientation of the grid can be easily determined Using a single basis pattern g, only one mark may be embedded at each grid position, leaving a total of $N^2$-4 grid positions for encoding the message 1610.

In order to use such alignment marks while still satisfying the specified constraint, the method 500 of encoding the message described previously should be slightly changed. In the method 500, the set of marks M created in the step 520 is initially empty. In the present example of the preferred CBC arrangement, a modified method is used in which the initial set M instead comprises the set of alignment marks and the initial set P excludes any similar mark at the grid position (N-1, N-1).

Encoding the Message

The message 1610 is encoded into a set of basis pattern marks in the step 1630 of the process 1600 using the modified method. The result of this step is a set M of translated basis patterns. For the purposes of the following discussion, a translation of the k'th mark will be indicated by the coordinate point $(x, y)_k$.

Forming the Watermark

The watermark W that is embedded into an image 1650 is created in the step 1640 of the method 1600. This watermark W generally consists of a scaled summation of the separate basis pattern marks. Specifically, the watermark W may be determined according to Formula (10), as follows:

$$g'(x,y) = \delta \cdot \sum_{k=1}^{|M|} g(x-x_k, y-y_k) \quad (10)$$

where:
|M| is the number of marks in the set M; and
$\delta$ is a constant embedding factor.

The embedding factor $\delta$ is used to make the watermark W component in the watermarked image 1670 substantially imperceptible to a human observer under normal viewing conditions.

Adding the Watermark to the Image

In a final step 1660 of the process 1600, the watermark W is added to the image 1650 to form the watermarked image 1670. This may be accomplished by simply summing the values of the watermark W pixels with the values of the corresponding image 1650 pixels.

If the image 1650 is in colour, then the watermark W is preferably added to the luminance part of the colour image 1650. This allows the watermark to survive when the watermarked image is converted from colour to a greyscale representation.

Any part of the watermark W outside the boundary of the image 1650 is discarded. The watermarked image 1670 is thus the same size as the image 1650.

It may be necessary to further modify the values of the pixels of the watermarked image 1670 to be integers between 0 and 255, this being the range typically used by digital devices to store colours. This may be done by truncation, direct rounding or some form of dithering such as Floyd-Steinberg error propagation. The watermarked image 1670 may then be displayed, printed, stored or communicated to other devices.

As set out in relation to the step 1630 of the process 1600, the message 1610 is used to determine the translations $(x, y)_k$ of the copies of the basis pattern g. As shall be described in detail below, correlation of a watermarked image with the basis pattern g used in the watermark, yields correlation magnitude peaks at those translations $(x, y)_k$ where the basis pattern g was embedded.

Simplified Watermarking Example

By way of further explanation, a simplified example of watermarking an image with an encoded message is now illustrated with reference to FIGS. 18 to 23. The method of encoding the pattern in this example is similar to that used in the previous example described above with respect to FIG. 6 except that a different mark is used and the modified method described above (i.e., using alignment marks) is substituted for the original method 500.

Figure 18:
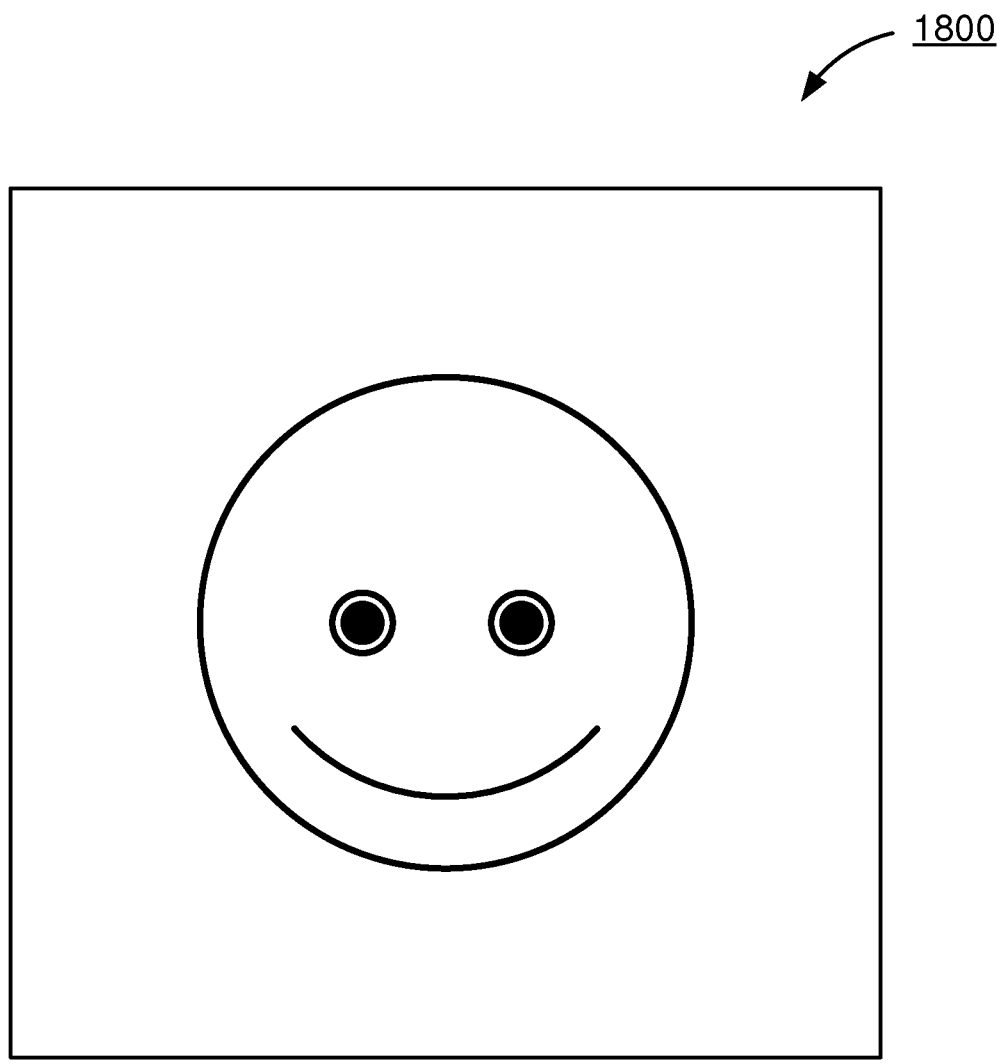
FIGS. 18 to 23 illustrate the steps of the process of watermarking an image with an encoded message by means of an example.

FIG. 18 shows an image 1800 into which a message comprising the characters "CBC" is to be encoded using a CBC watermark.

Figure 19:
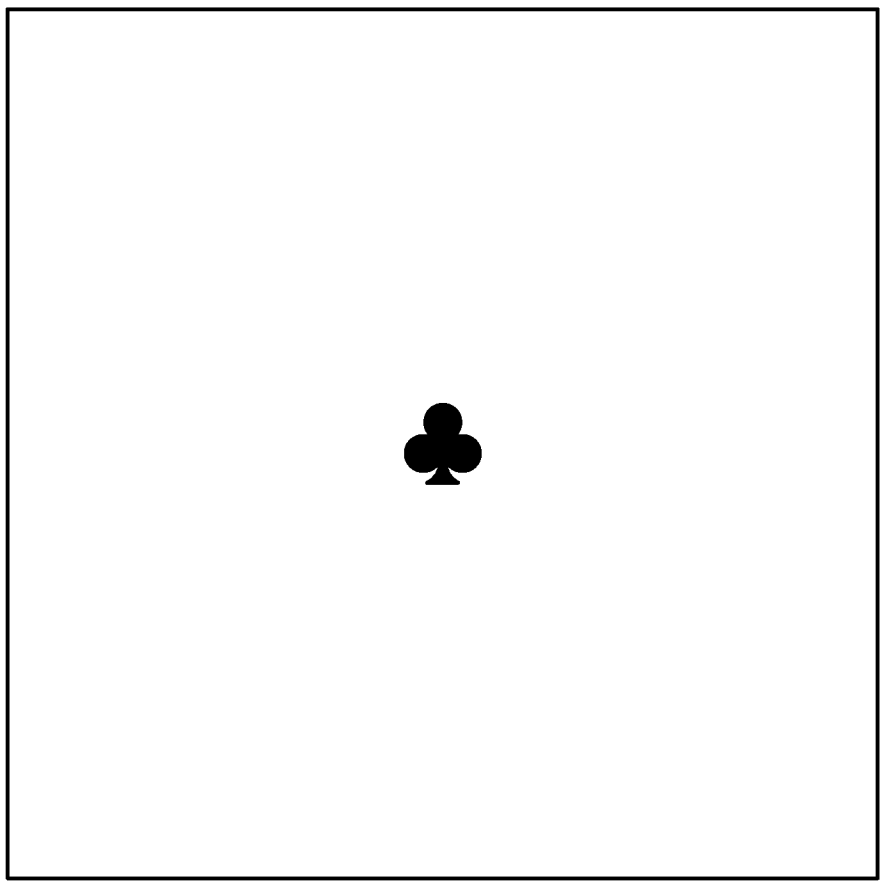

FIG. 19 shows a simple basis pattern 1900.

Figure 20:
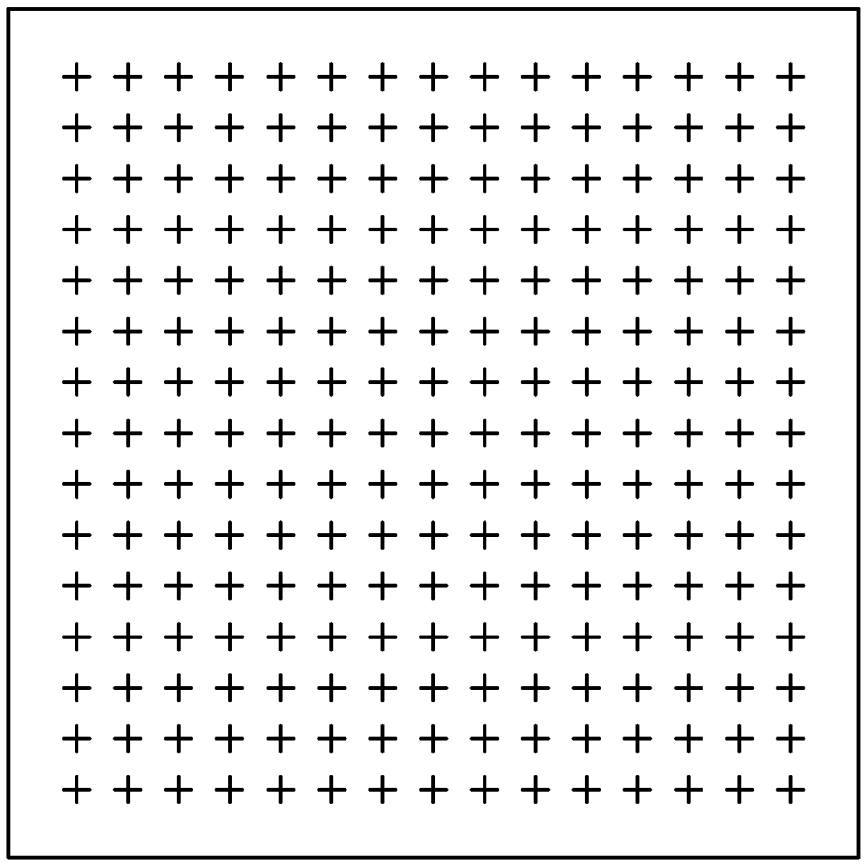

FIG. 20 illustrates the 15×15 grid for encoding the message.

Figure 21:
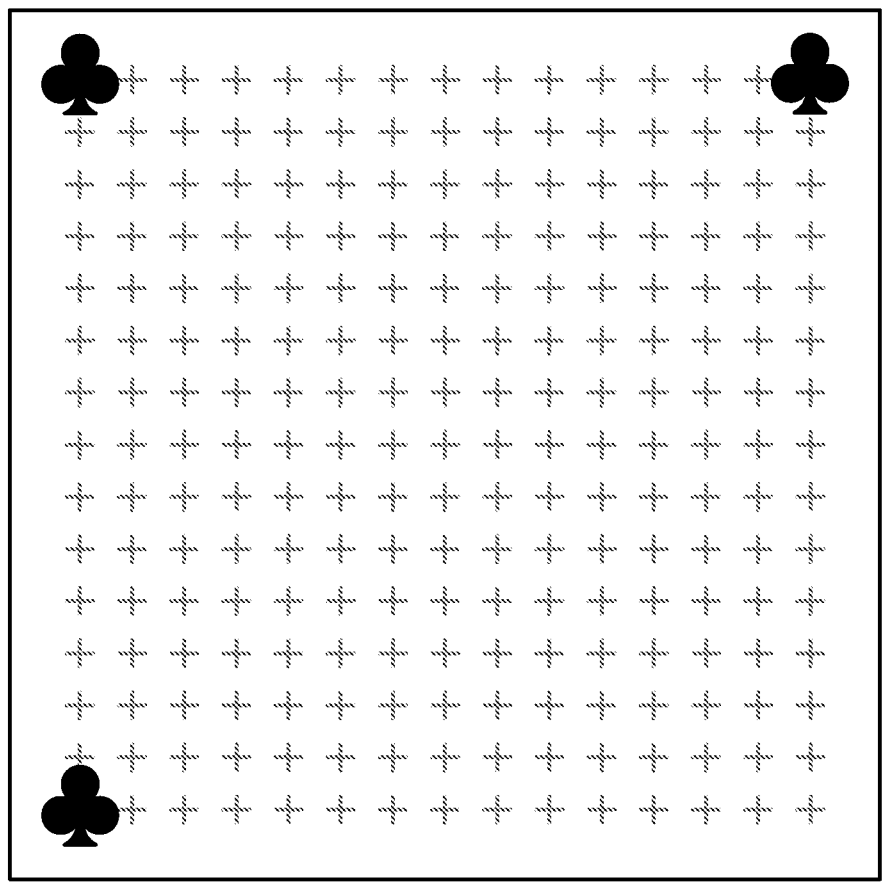
Figure 22:
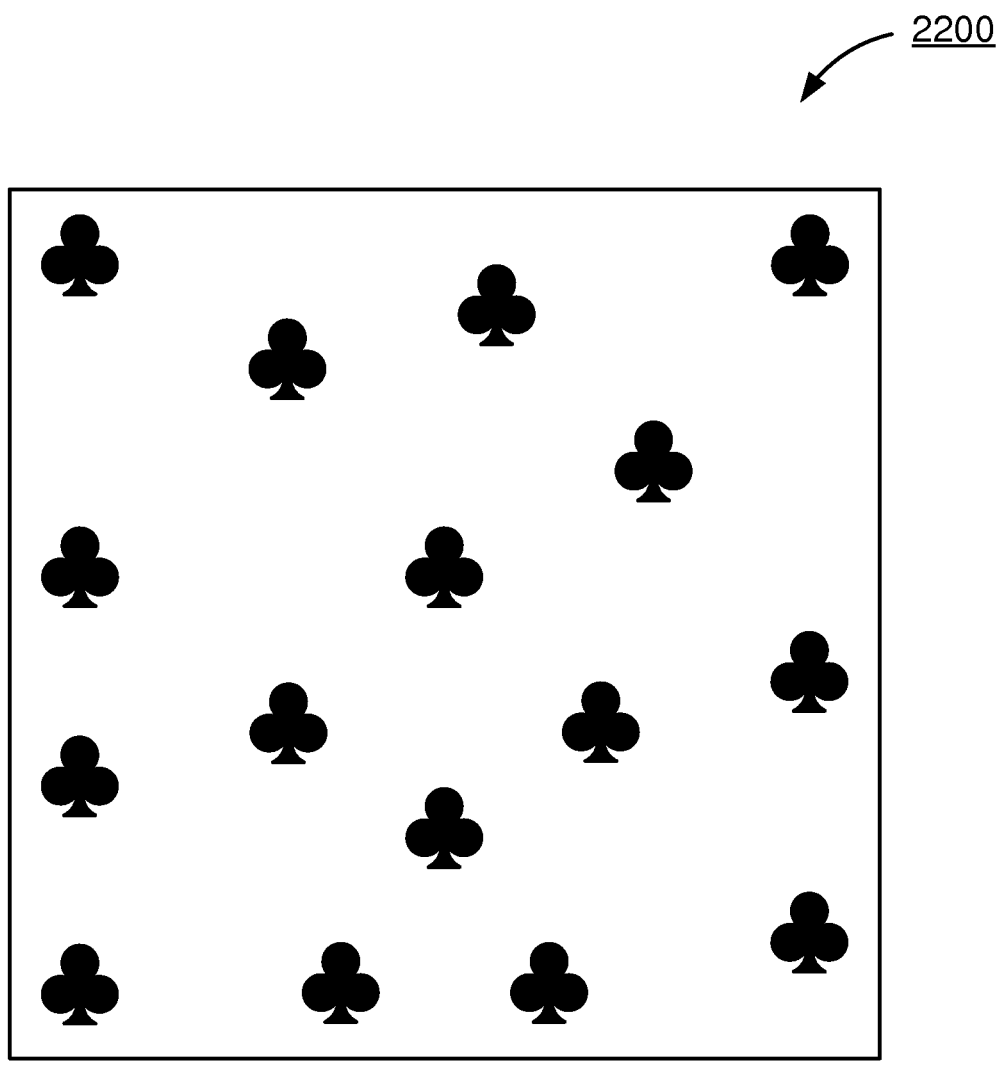

FIG. 21 shows the three alignment patterns and FIG. 22 shows the complete set of basis patterns encoding the message.

Figure 23:
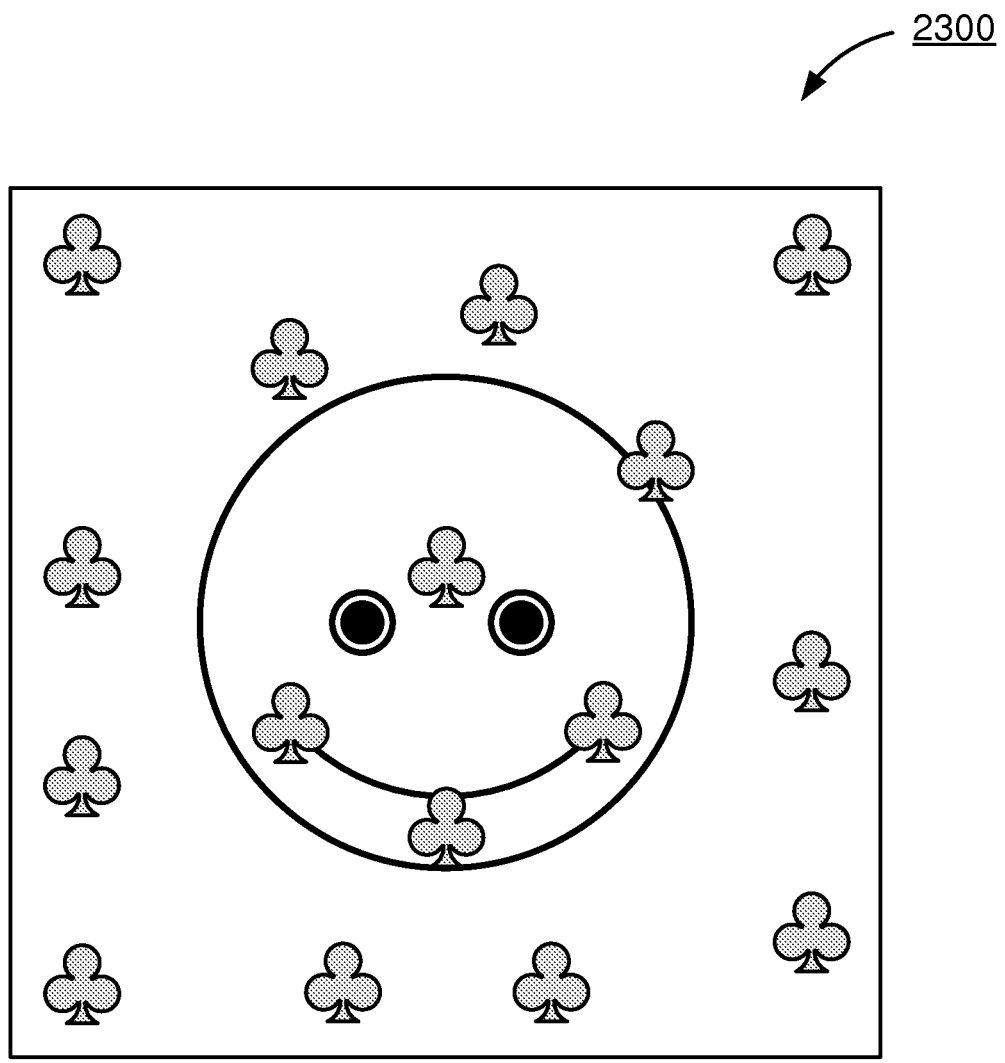

Finally, FIG. 23 shows the watermarked image 2300 formed in the step 1660 of the method 1600 by adding the watermark 2200 to the image 1800.

Details of Alignment Mark Use

As with many applications in machine and computer vision, decoding information previously encoded using marks located at particular positions requires alignment of possibly transformed image coordinates with the original coordinates.

To this end, before discussing decoding of a message embedded as a watermark, the use of the alignment marks is now described in more detail.

Such alignment marks can take many forms. In the particular implementation described previously, three alignment marks are added to the image, with the copies of the basis pattern of the alignment marks being placing at image translations $(x, y)_k$ corresponding to grid locations (0, 0), (0, N-1) and (N-1, 0) of the N×N grid, thereby placing the alignment marks at the positions corresponding to three corners of the square grid of known size and forming an 'L'-shape.

The detection of the possibly transformed locations $(x, y)_k'$ of the alignment marks is accomplished using the method described below in which a basis pattern g is correlated with an image containing the alignment mark. As described previously, the preferred basis pattern g is an LRHF and is consequently invariant under scaling and rotation.

Once the possibly transformed translations $(x, y)_k'$ of the alignment marks are determined, a linear transformation to register the corresponding positions of the original and transformed images may be estimated as follows:

A rotation angle may be estimated using the vector between the two detected alignment mark translations $(x, y)_k'$ which are furthest apart. Similarly, a total scaling factor may be estimated using the distance between these two alignment mark translations $(x, y)_k'$. A shear factor may be estimated by measuring the angle between the three alignment mark translations $(x, y)_k'$. A change in aspect ratio may be estimated by measuring the difference in the length of the horizontal side and the vertical side of the 'L' shape formed by the three alignment marks. A middle point of the 'L' shape may be used to define the coordinate system origin of the grid.

The four parameters (angle, scaling, shear and aspect ratio) completely define a linear transformation. This linear transformation may be inverted to restore the transformed image coordinates to the original coordinates.

Basis Pattern Detection

A method of determining the locations of the basis pattern marks in a watermarked image is now described.

One of the principle applications of correlation in image processing is in the area of template matching. Pattern matching, for example, by way of correlation, may therefore be used to detect the presence of a basis pattern g in an image f, where:

$$f(x, y) = p(x, y) + \delta \cdot \sum_{k=1}^{K} g(x - x_k, y - y_k) \tag{11}$$

where p(x, y) is the image within which the watermark W was embedded.

Correlation between the basis pattern g and the image f produces an image q(x, y) with peak values at translations where the image f best matches the pattern g.

The Fourier correlation theorem provides:

$$q(x,y) = f(x,y) \otimes g(x,y) \Leftrightarrow F^*(u,v) \cdot G(u,v) = Q(u,v) \tag{12}$$

where F, G and Q are the Fourier transforms of the image f, the pattern g and the image q, respectively.

Thus, correlation can be implemented by Fourier transforming the image f and the basis pattern g to obtain Fourier transformed functions F and G, complex conjugating one of the Fourier transformed functions, say F, and then multiplying these two functions F* and G, before transforming back.

Further, with the aid of Formula (11) and the Fourier correlation theorem, the following formula can be derived:

$$q(x, y) = \left[ p(x, y) + \delta \cdot \sum_{k=1}^{K} g(x - x_k, y - y_k) \right] \otimes g(x, y) \tag{13}$$

$$= [p(x, y) \otimes g(x, y)] +$$

$$\left[ \delta \cdot \sum_{k=1}^{K} g(x - x_k, y - y_k) \otimes g(x, y) \right]$$

Image q(x, y) thus comprises values resulting from:

1. the cross-correlation between image p and basis pattern g, which with natural occurring image p will typically be small; and
2. the auto-correlation of basis pattern g.

Using a wideband signal as the basis pattern g, the auto-correlation will provide K sharp peaks at translations $(x, y)_k$. LRHF basis patterns have the further advantageous property that sharp magnitude peaks result from the correlation of the basis pattern with the real part of the basis pattern.

In addition to the correlation process outlined above, enhanced forms of correlation may also be usefully employed for the detection of embedded patterns. One form of enhanced correlation is known as "phase-only" correlation. The phase-only correlation may be calculated by setting the Fourier correlation magnitude of the product $F^* \cdot G$ to unity before applying the inverse Fourier transform. This ensures that only the phase terms of the frequencies in the Fourier domain contribute to the overall correlation peak.

Decoding a CBC Watermark

Recovering a message previously stored in an image by means of a CBC watermark is now described with reference to the schematic data flow diagram FIG. 24.

Figure 24:
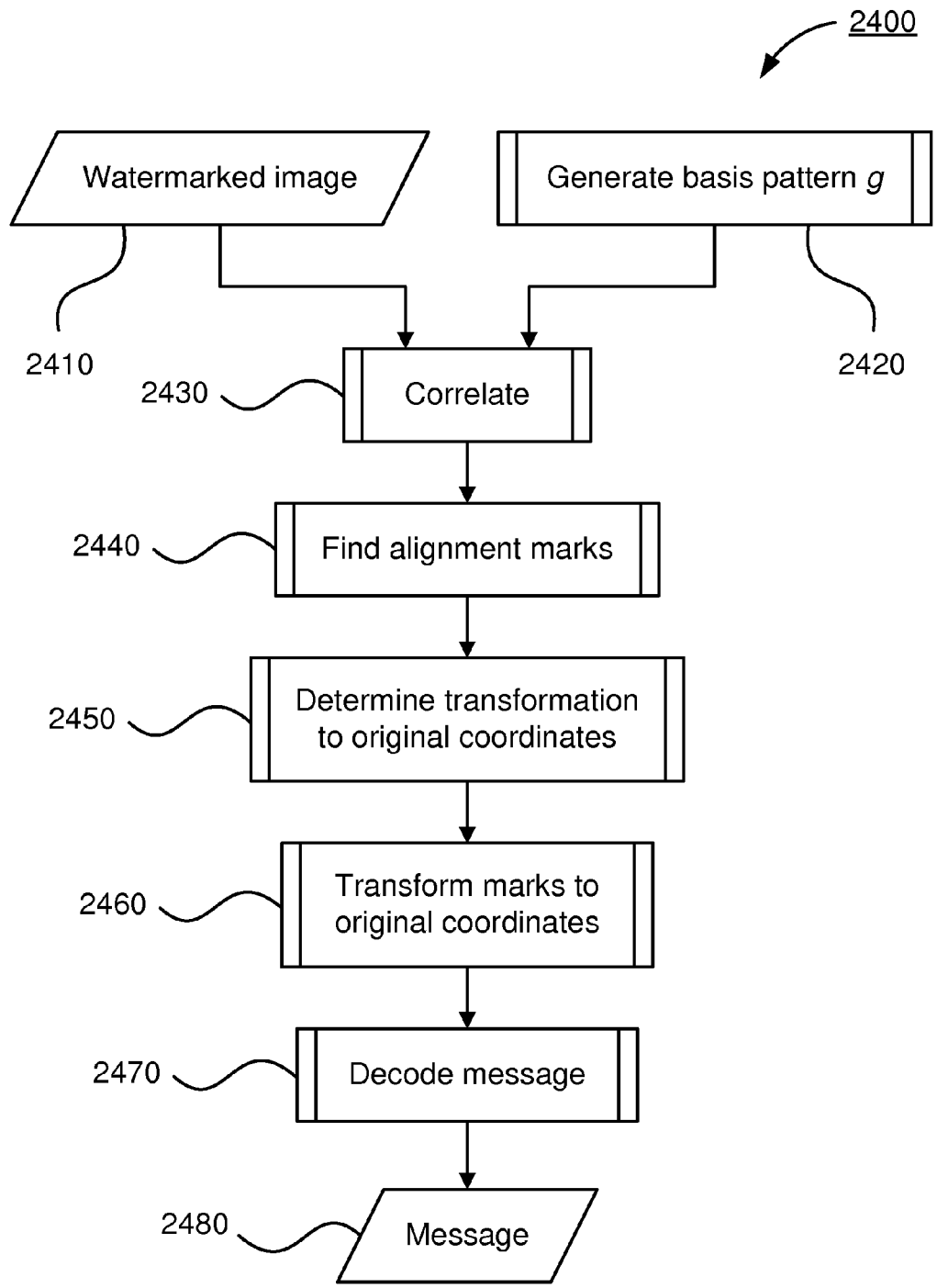
FIG. 24 shows a schematic data flow diagram of a method of detecting a watermark in a watermarked image and decoding a message contained in the watermark.

FIG. 24 illustrates a method 2400 of detecting a watermark in a watermarked image 2410 and decoding a message 2480 contained in the watermarked image 2410.

In a first step 2420 of the method 2400, the basis pattern g used in the encoding process is regenerated using the known basis function parameters.

If the basis pattern g is present in the watermarked image 2410, then the image resulting from a subsequent correlation step 2430 will have correlation magnitude peaks at translations $(x, y)_k'$ where that basis pattern g was embedded into the watermarked image 2410. In general, even though the watermark W is imperceptibly added to form the image 2410, correlation of the image 2410 with the correct basis pattern g provides the retrieval of the translations $(x, y)_k'$ with high accuracy.

The correlation magnitude peaks at translations $(x, y)_k'$ include those corresponding to the three alignment marks as well as the message marks. In a next step 2440, the alignment marks are distinguished from the message marks.

By ensuring that the message marks are kept completely inside the square defined by the three alignment marks, as was done in the example of FIGS. 18 to 23, the alignment marks may be distinguished from any other marks by finding a bounding box around the detected correlation magnitude peaks, and then selecting the three points furthest from the centre of the bounding box.

Alternatively, a more sophisticated method may be used that searches a larger set of detected correlation magnitude peaks for groups of three peaks that are close to the form of three corners of a square, thus discounting any false peaks that may have been incorrectly detected.

Using any one of the methods set out above, the alignment marks are identified in step 2440 of the method 2400.

In a next step 2450, the linear transformation required to register the locations $(x, y)_k'$ of the alignment marks with the known original locations (0, 0), (0, N-1) and (N-1, 0) is determined as set out above in relation to alignment marks.

Following the step 2450, the method 2400 proceeds to a step 2460 where the message marks with locations $(x, y)_k'$ are transformed to the originally encoded locations $(x, y)_k$.

In a final step 2470, the message 2480 is decoded from the set of transformed message marks using the method 1100 previously described, taking care to use the same modified method 500' described above with respect to the watermark encoding process.

Refinements to the Watermarking Process

Without changing the essential character of the methods 1600 and 2400, a number of refinements may be used to improve the efficacies thereof.

In a first refinement, the pixel values of each basis pattern g are multiplied by a separate scaling constant when the watermark W is formed in the step 1640. The separate scaling constant for each copy of the basis pattern g is chosen such that the detectability of all the copies are normalised. Accordingly, copies of the basis pattern to be added closer to the edge of the image 1650 and which would therefore be trimmed when it is added onto the image 1650 may be scaled slightly higher than those copies that would be complete when added to the image 1650.

In a second refinement, multiple basis patterns are used, with each basis pattern orthogonal to all other basis patterns. For example, if LRHF basis patterns of the form of Formula (9) are used, different basis patterns that are orthogonal to all other basis patterns may be generated by choosing sufficiently different parameters R and/or σ for each pattern. In this case, multiple marks with different basis patterns may be added at the same location while remaining separately detectable.

Low-Visibility Dots Example

A second example of the preferred embodiment, suitable for encoding information on a printed document, are now be described with reference to FIGS. 25 to 30. In this example the CBC marks comprise indistinguishable low-visibility dots arranged in repeating patterns over an area of the document.

Processing Environment for Low-Visibility Dots Embodiment

Figure 25:
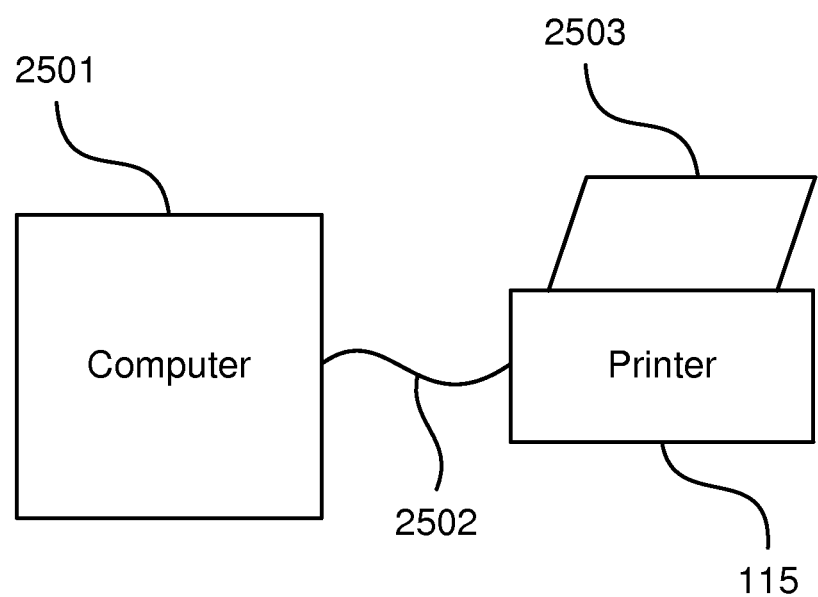
FIG. 25 illustrates equipment suitable for printing CBC's.

FIG. 25 shows equipment suitable for printing of documents including one or more CBC's. A computer module 2501 may be connected to a printer 115, such as a laser printer or inkjet printer, through a communications cable 2502. The printer 115 is able to print on a piece of paper 2503 or other print medium to provide a hard copy document.

Figure 26:
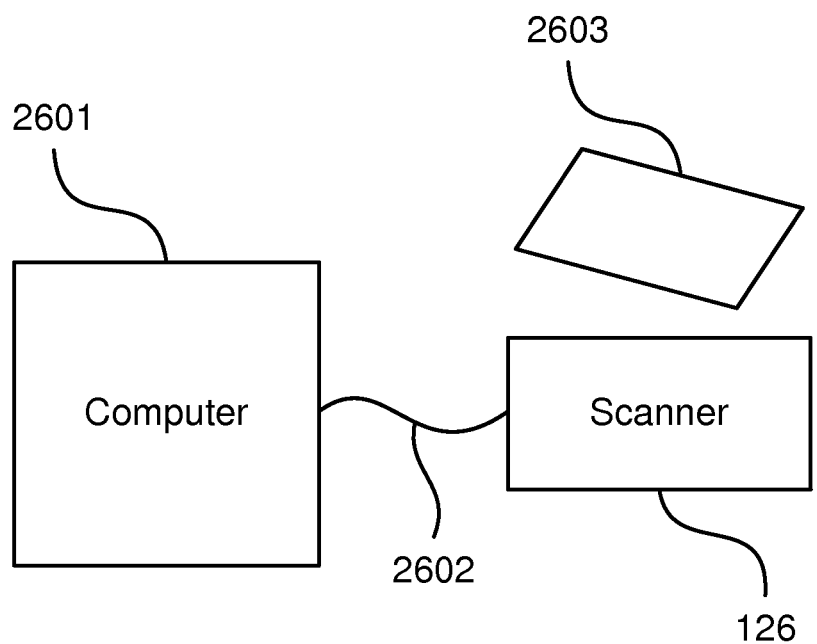
FIG. 26 illustrates equipment suitable for computer reading of printed CBC's.

FIG. 26 shows a scanner 126, such as a desktop flatbed scanner, which is connected to a computer module 2601 through a communications cable 2602. The computer modules 2501 and 2601 may be the same computer (e.g., 101), or they may be separate computers, operable independently or, for example, connected via a computer network. The equipment is suitable for computer reading of a document including one or more CBC's, for example existing on a hard copy document 2603 scanned by the scanner 126 in to the computer module 2601.

Dot Pattern with Symmetry

A new arrangement facilitating reading of a CBC comprising a pattern of dots is now described with reference to FIGS. 27 and 28.

Figure 27:
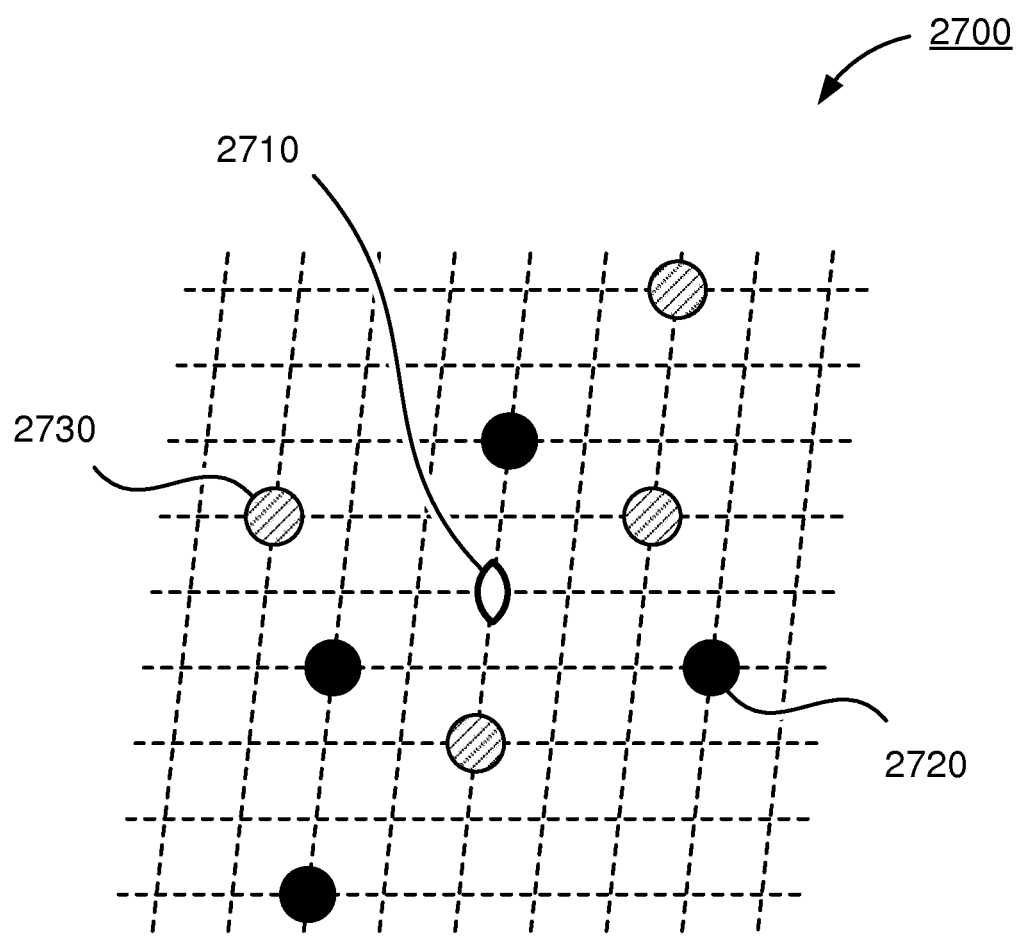
FIG. 27 shows an example "unit cell" including a twofold symmetry axis.

Refer first to FIG. 27, which shows a new exemplary pattern 2700. Compared to the previous example 200, the pattern 2700 incorporates an additional twofold rotational symmetry axis 2710 at the centre of the grid.

This symmetry element has the effect of duplicating each dot placed using the method 500 (e.g., 2720) so that a symmetric dot (e.g., 2730) is also placed.

In FIG. 27 the original and symmetric dots are shaded differently merely to allow them to be easily distinguished for the purposes of this explanation. In practice, the original and symmetric dots are usually identical.

Figure 28:
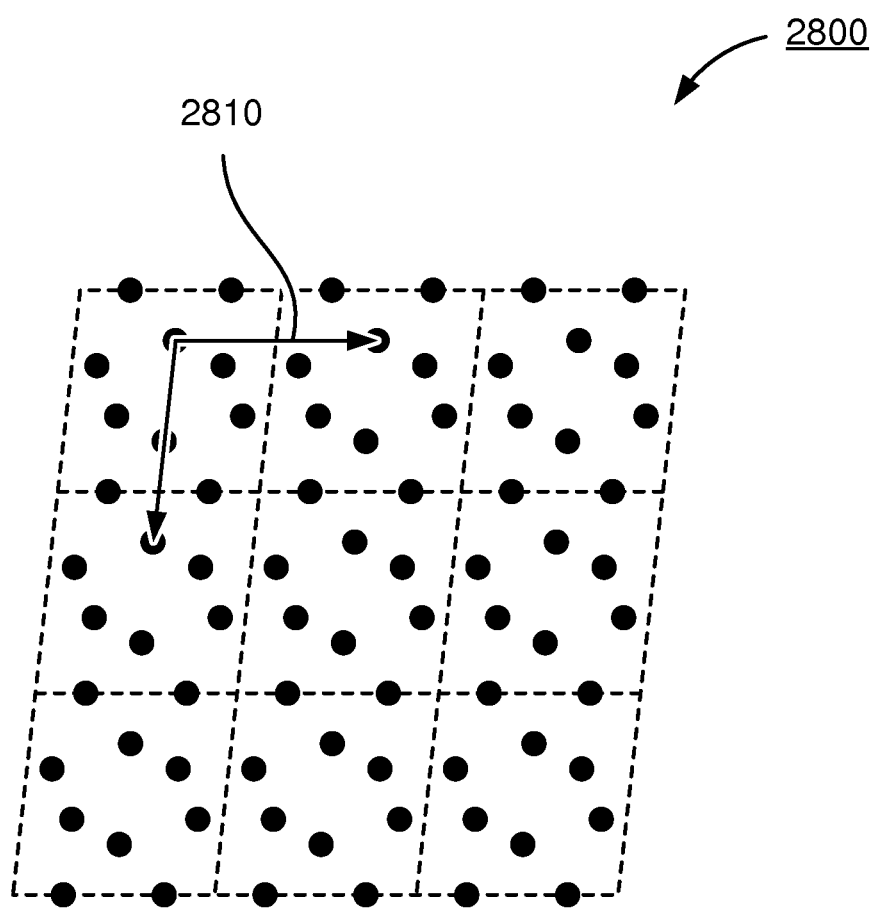
FIG. 28 shows an example of tiling a unit cell to cover a larger area.

Refer now to FIG. 28 which illustrates "tiling" of the pattern 2700 over an arbitrary area by the addition of translational symmetry vectors (e.g., 2810) corresponding to the grid axis vectors.

In fact, the symmetry exhibited by the resulting pattern 2800 is just one example of a two dimensional "wallpaper" group, well-known to those skilled in the relevant art. The present example has symmetry 2222 in "orbifold notation".

In this present example of the preferred CBC arrangements, of the 17 wallpaper groups, the 13 incorporating rotation axes may be used, as providing the least ambiguous determination of the grid origin.

Determining Grid Origin and Axes

Given a pattern with translational and rotational symmetry, the grid axes and a small set of possible grid origins may be determined using correlation-based methods which are now described with reference to FIGS. 29 and 30.

Figure 29:
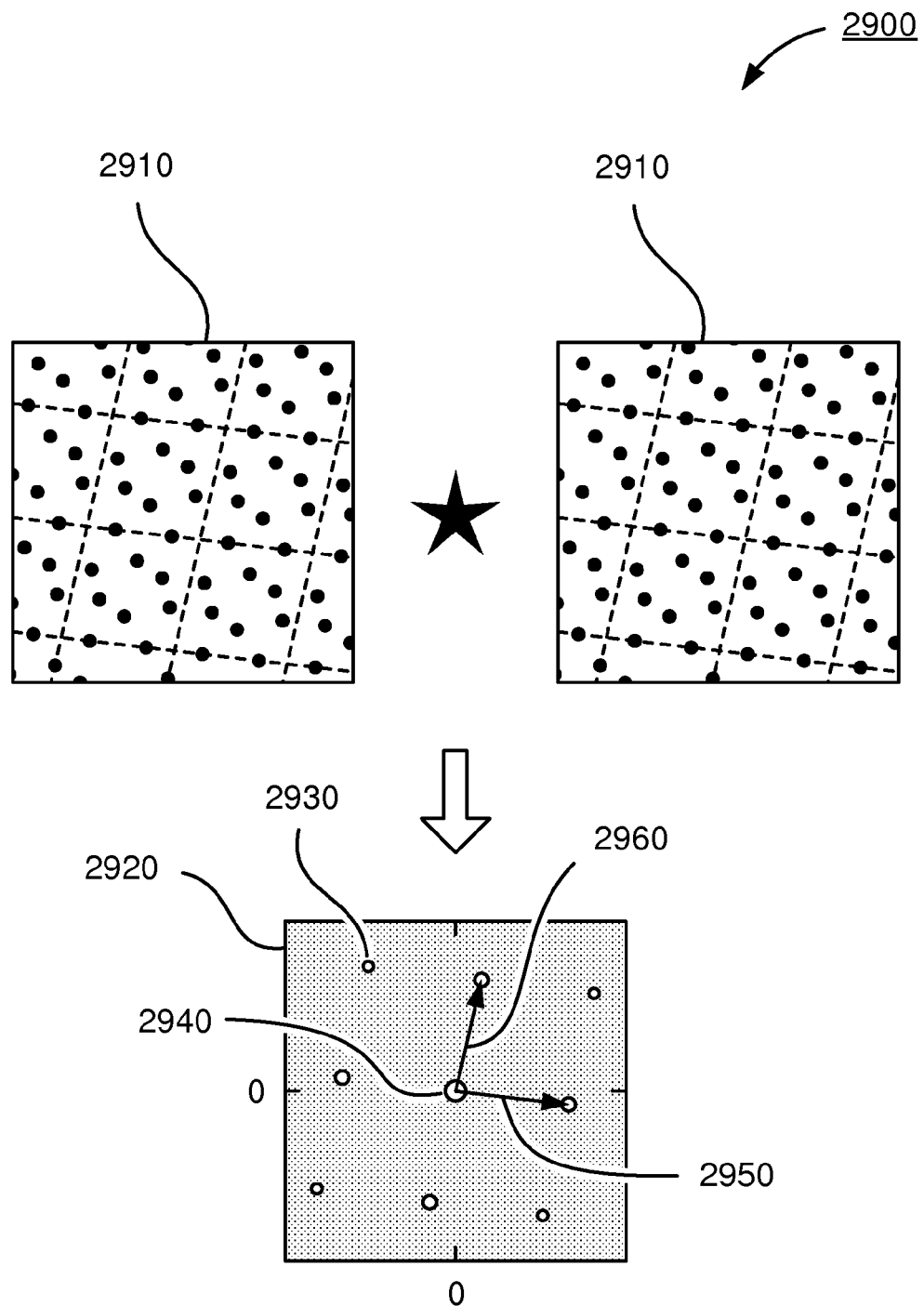
FIG. 29 illustrates the correlation-based calculation to determine the grid axes.

Refer to FIG. 29 which illustrates a method 2900 of determining the grid axes. A rectangular patch of a greyscale image of the printed pattern 2910 is first correlated with another copy of the same patch to generate an auto-correlation image 2920. This step may be accomplished using a variety of methods well-known in the art. In the preferred CBC arrangement, the auto-correlation image may be generated by a method similar to that described previously with respect to detection of an embedded basis function, namely:

1. normalising the greyscale image patch to an average value of 0;
2. multiplying the image patch by a smooth window function with value 0 at the edges and value 1 in the interior of the image (one typical example would be a so-called "raised cosine" function in two dimensions);
3. calculating the Fourier transform F of the resulting windowed image patch;
4. forming the element-wise product $F^* \cdot F$ of the conjugate of F with F; and
5. calculating the inverse Fourier transform of the product.

Within the autocorrelation image 2920 a number of peaks (e.g., 2930) may typically be found. In addition to a peak 2940 at the origin, other peaks corresponding to combinations of the grid axes may also appear. In the preferred CBC arrangement, the grid axis vectors 2950 and 2960 may be identified as corresponding to the closest peaks satisfying the expected geometry. Preferably, the encoded grid axes are chosen to permit this determination to be made unambiguously by, for example, making the lengths of the axes somewhat different, or making the angle between the axes significantly different from a right angle.

Figure 30:
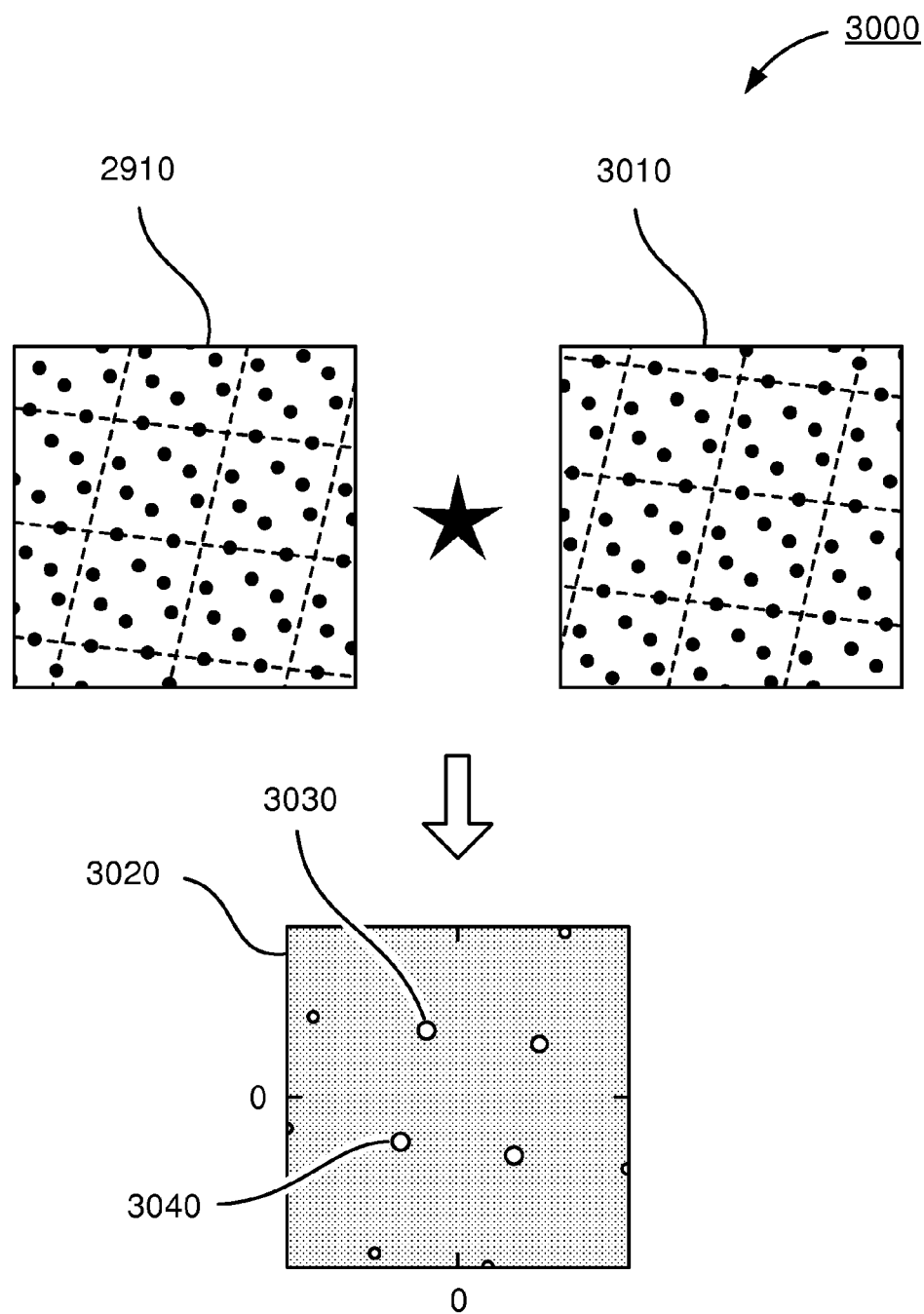
FIG. 30 illustrates the correlation-based calculation to determine the grid origin.

Turning finally to FIG. 30, a similar calculation 3000 may be used to determine the grid origin, at least up to a known set of possible translations. This figure illustrates the calculation that may be used in the case where a two-fold, four-fold, or six-fold axis is present.

In this case, rather than the image patch 2910 being correlated with itself as in the determination of the grid axes, the image patch 2910 is correlated with a copy of itself rotated by 180° (3010). The resulting cross-correlation image 3020 typically contains a number of peaks (e.g., 3030), separated, as before, by combinations of the grid axes.

Given the coordinates $(p_x, p_y)$ of a peak (e.g., 3040), the corresponding coordinates $(o_x, o_y)$ of the origin in the original image patch 2910 may be calculated according to Formula (14), as follows:

$$(p_x, p_y) = \left(\frac{o_x}{2}, \frac{o_y}{2}\right) \quad (14)$$

As there are multiple peaks separated by combinations of the grid axis vectors, there will be at least four possible unique origins. In the case of higher symmetry wallpaper groups, there will often be more. As a consequence, it will typically be necessary to attempt decoding using each possible and to take as the correct origin the one that yields the message with least total error, $\epsilon$.

One possible enhancement to the methods of determining the grid origin and axes described above is to suppress any background content prior to applying these methods. In the preferred CBC arrangement, this is done by:

1. first finding dots of the appropriate size and shape in the greyscale image;
2. creating a new blank image with the same dimensions as the original;
3. placing synthetic dots in the new image at the detected dot locations; and then
4. determining the origin and axes as described above, using the resulting image.

Exploiting Redundancy in Decoding

Once the grid axes and possible origin have been determined, the data encoded within an image patch (e.g., 2910) may be decoded by locating all of the dots within a single given "cell" and applying the method 1100.

Figure 7:
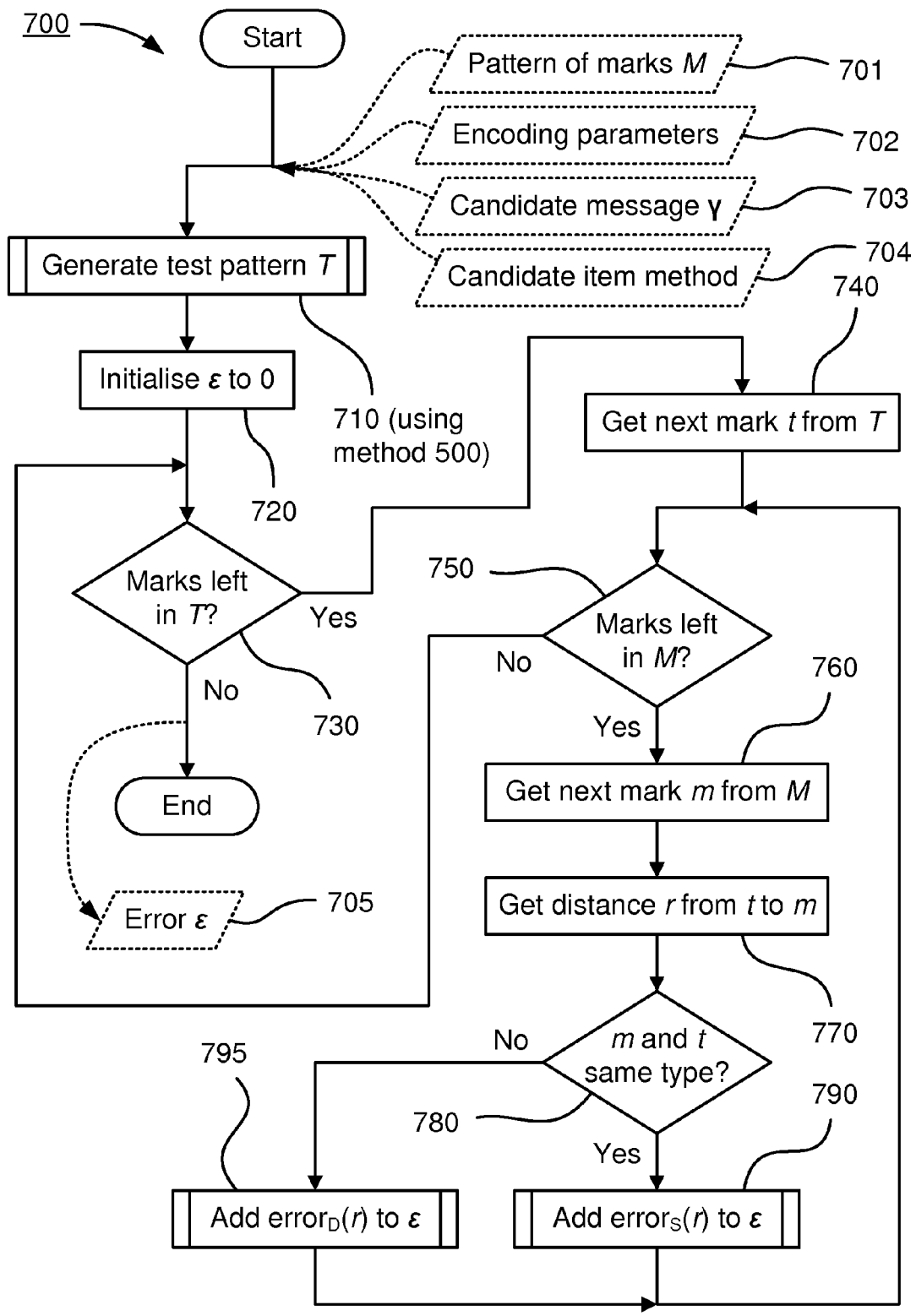
FIG. 7 is a schematic flow diagram for a method of calculating an error value for a given candidate message with respect to a given encoded pattern of marks making up a CBC.

Advantageously, however, all of the dots within a given area may be used once a cell origin and axes have been determined Referring again to the method 700 illustrated in FIG. 7, in the preferred CBC arrangement this may be accomplished by:

1. determining the error of the test dot t using a pattern M comprising all of the dots within the given area; and
2. determining the distance r from t to a given dot m in M in step 770 as the least distance from t to any symmetry-related copy of m.

If the spatial constraint is not important in the particular field of application, the spatial constraint may be omitted from the method, and in such an arrangement, data may be encoded using a truncated version of the process 500 described in relation to FIG. 5. In particular, the arrow 591, which presently indicated the flow of the process 500 from the step 580 to the step 590, can instead direct the process 500 to flow from the step 580 to the decision step 530, and the steps 590 and 595 can be removed. This would have the effect of removing consideration of the constraint 504 from the process 500. Consequently, the step 580 can remove a mark m from the sequence P and add the mark m to the set M without the mark m being removed if M (after m has been added thereto) violates the constraint.

INDUSTRIAL APPLICABILITY

The arrangements described are applicable to the computer and data processing industries and particularly for the image processing industry.

The foregoing describes only some embodiments of the present invention, and modifications and/or changes can be made thereto without departing from the scope and spirit of the invention, the embodiments being illustrative and not restrictive. Thus for example, the CBC arrangements, implemented using a suitable pseudorandom process subject to a defined constraint, may be applied to areas other than embedding message data into images.

The claims defining the invention are as follows:

1. A method of decoding a pattern of marks satisfying a predetermined constraint in an encoded image, to reconstruct a recovered message, the method comprising the steps of:
   (a) determining a set of data items into which candidate messages can be partitioned;
   (b) determining a set of candidate messages;

(c) selecting a current candidate message from the determined set of candidate messages;
(d) applying an encoding method to said current candidate message to generate a current pattern of marks by;
   (da) partitioning the selected current candidate message into said data items;
   (db) encoding a first mark into a target area of an original image to form the encoded image, at a location determined by applying a hash function to a first data item of the selected current candidate message;
   (dc) encoding a second mark into the target area at a location dependent upon (i) a hash value determined by applying the hash function to the first data item and a second data item of the selected current candidate message, (ii) the location of the encoded first mark, and (iii) a predetermined constraint; wherein the first and second marks form at least part of a pattern of marks in the target area of the encoded image, said pattern having a visual characteristic defined by the predetermined constraint;
(e) if the current pattern of marks does not permit addition of a further mark without violating the predetermined constraint, then the current candidate message is one of said recovered message and a null set;
(f) if the current pattern of marks does permit addition of a further mark without violating the predetermined constraint, then the method comprises the further steps of:
   (fa) creating a set of new candidate messages by appending each possible data item from the step (a) to the current candidate message;
   (fb) adding the new set of candidate messages to the set determined in the step (b); and
   (fc) repeating the steps (c) to (f).

2. A decoder for decoding a pattern of marks satisfying a predetermined constraint in an encoded image, to reconstruct a recovered message, the decoder comprising:
(a) a data item determining unit for determining a set of data items into which candidate messages can be partitioned, and determining a set of candidate messages;
(b) a selecting unit for selecting a current candidate message from the determined set of candidate messages;
(c) an applying unit for applying an encoding method to said current candidate message to generate a current pattern of marks, the applying unit comprising:
   (ca) a partitioning unit configured to partition the selected current candidate message into said data items;
   (cb) a first encoding unit configured to encode a first mark into a target area of an original image to form the encoded image, at a location determined by applying a hash function to a first data item of the selected current candidate message;
   (cc) a second encoding unit configured to encode a second mark into the target area at a location dependent upon (i) a hash value determined by applying the hash function to the first data item and a second data item of the selected current candidate message, (ii) the location of the encoded first mark, and (iii) a predetermined constraint; wherein the first and second marks form at least part of a pattern of marks in the target area of the encoded image, said pattern having a visual characteristic defined by the predetermined constraint;
(d) a first determining unit for, if the current pattern of marks does not permit addition of a further mark without violating the predetermined constraint, establishing that the current candidate message is one of said recovered message and a null set;
(e) a second determining unit for, if the current pattern of marks does permit addition of a further mark without violating the predetermined constraint, effecting the further steps of:
   (ea) creating a set of new candidate messages by appending each possible data item from the step (a) to the current candidate message;
   (eb) adding the new set of candidate messages to the set determined in the step (b); and
   (ec) repeating the steps performed by the elements in (b) to (f).

3. A decoder for decoding a pattern of marks satisfying a predetermined constraint in an encoded image, to reconstruct a recovered message, said decoder comprising:
a memory for storing a program; and
a processor for executing the program, said program configured to direct the processor to perform the steps of:
(a) determining a set of data items into which candidate messages can be partitioned;
(b) determining a set of candidate messages;
(c) selecting a current candidate message from the determined set of candidate messages;
(d) applying an encoding method to said current candidate message to generate a current pattern of marks by:
   (da) partitioning the selected current candidate message into said data items;
   (db) encoding a first mark into a target area of an original image to form the encoded image, at a location determined by applying a hash function to a first data item of the selected current candidate message;
   (dc) encoding a second mark into the target area at a location dependent upon (i) a hash value determined by applying the hash function to the first data item and a second data item of the selected current candidate message, (ii) the location of the encoded first mark, and (iii) a predetermined constraint; wherein the first and second marks form at least part of a pattern of marks in the target area of the encoded image, said pattern having a visual characteristic defined by the predetermined constraint;
(e) if the current pattern of marks does not permit addition of a further mark without violating the predetermined constraint, then the current candidate message is one of said recovered message and a null set;
(f) if the current pattern of marks does permit addition of a further mark without violating the predetermined constraint, then the method comprises the further steps of:
   (fa) creating a set of new candidate messages by appending each possible data item from the step (a) to the current candidate message;
   (fb) adding the new set of candidate messages to the set determined in the step (b); and
   (fc) repeating the steps (c) to (f).

4. A system comprising an encoder for encoding a message into a target area of an original image to form an encoded image, and a decoder for decoding a pattern of marks satisfying a predetermined constraint in an encoded image, to reconstruct a recovered message; said encoder comprising:
a memory for storing a program; and
a processor for executing the program, said program configured to direct the processor to perform the steps of:
determining a set of data items into which the message can be partitioned;
partitioning the message into said data items;

encoding a first mark into the target area at a location determined by applying a hash function to a first data item; and encoding a second mark into the target area at a location dependent upon (i) a hash value determined by applying the hash function to the first data item and a second data item, (ii) the location of the encoded first mark, and (iii) a predetermined constraint; wherein the first and second marks form at least part of a pattern of marks in the target area of the encoded image, said pattern having a visual characteristic defined by the predetermined constraint; and said decoder comprising:

a memory for storing a program; and a processor for executing the program, said program configured to direct the processor to perform the steps of:

(a) determining a set of data items into which candidate messages can be partitioned;

(b) determining a set of candidate messages;

(c) selecting a current candidate message from the determined set of candidate messages;

(d) applying an encoding method to said current candidate message to generate a current pattern of marks by:
  (da) partitioning the selected current candidate message into said data items;
  (db) encoding a first mark into a target area of an original image to form the encoded image, at a location determined by applying a hash function to a first data item of the selected current candidate message;
  (dc) encoding a second mark into the target area at a location dependent upon (i) a hash value determined by applying the hash function to the first data item and a second data item of the selected current candidate message, (ii) the location of the encoded first mark, and (iii) a predetermined constraint; wherein the first and second marks form at least part of a pattern of marks in the target area of the encoded image, said pattern having a visual characteristic defined by the predetermined constraint;

(e) if the current pattern of marks does not permit addition of a further mark without violating the predetermined constraint, then the current candidate message is one of said recovered message and a null set;

(f) if the current pattern of marks does permit addition of a further mark without violating the predetermined constraint, then the method comprises the further steps of:
  (fa) creating a set of new candidate messages by appending each possible data item from the step (a) to the current candidate message;
  (fb) adding the new set of candidate messages to the set determined in the step (b); and
  (fc) repeating the steps (c) to (f).

5. A recovered message, decoded using the method of claim 1.

6. A computer readable non-transitory tangible storage medium having a computer program recorded therein, the program being executable by a computer apparatus to make the computer decode a pattern of marks satisfying a predetermined constraint in an encoded image, to reconstruct a recovered message by performing the steps of:

(a) determining a set of data items into which candidate messages can be partitioned;

(b) determining a set of candidate messages;

(c) selecting a current candidate message from the determined set of candidate messages;

(d) applying an encoding method to said current candidate message to generate a current pattern of marks by;
  (da) partitioning the selected current candidate message into said data items;
  (db) encoding a first mark into a target area of an original image to form the encoded image, at a location determined by applying a hash function to a first data item of the selected current candidate message;
  (dc) encoding a second mark into the target area at a location dependent upon (i) a hash value determined by applying the hash function to the first data item and a second data item of the selected current candidate message, (ii) the location of the encoded first mark, and (iii) a predetermined constraint; wherein the first and second marks form at least part of a pattern of marks in the target area of the encoded image, said pattern having a visual characteristic defined by the predetermined constraint;

(e) if the current pattern of marks does not permit addition of a further mark without violating the predetermined constraint, then the current candidate message is one of said recovered message and a null set;

(f) if the current pattern of marks does permit addition of a further mark without violating the predetermined constraint, then the method comprises the further steps of:
  (fa) creating a set of new candidate messages by appending each possible data item from the step (a) to the current candidate message;
  (fb) adding the new set of candidate messages to the set determined in the step (b); and
  (fc) repeating the steps (c) to (f).

7. A method according to claim 1, wherein the current candidate message comprises a string of binary numbers, and the method of determining the data items uses a predetermined number of said binary numbers for each data item.

8. A method according to claim 7, wherein the application of the hash function to the first data item and the second data item comprises concatenating the first data item and the second data item and applying the hash function to the concatenated first and second data items.

9. A method according to claim 1, wherein the first mark and the second mark are of different types.

10. A method according to claim 1, wherein prior to the partitioning step the method comprises ordering the current candidate message to place more important information toward the start of the message and less important information toward the end of the message.

11. A method according to claim 1, wherein an initial segment of the recovered message comprises a series of data items identical to corresponding items of the originally encoded message, and a subsequent segment of the recovered message comprises a series of random data items unrelated to the corresponding elements of the originally encoded message.

* * * * *